(12) United States Patent
Fu et al.

(10) Patent No.: US 9,722,737 B2
(45) Date of Patent: Aug. 1, 2017

(54) METHOD AND APPARATUS FOR SENDING AND RECEIVING HARQ-ACK FEEDBACK INFORMATION

(71) Applicant: Samsung Electronics Co., Ltd., Suwon-si, Gyeonggi-do (KR)

(72) Inventors: Jingxing Fu, Beijing (CN); Chengjun Sun, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/411,718

(22) PCT Filed: Jun. 27, 2013

(86) PCT No.: PCT/KR2013/005701
§ 371 (c)(1),
(2) Date: Dec. 29, 2014

(87) PCT Pub. No.: WO2014/003456
PCT Pub. Date: Jan. 3, 2014

(65) Prior Publication Data
US 2015/0146643 A1 May 28, 2015

(30) Foreign Application Priority Data
Jun. 27, 2012 (CN) .......................... 2012 1 0218451

(51) Int. Cl.
*H04W 72/04* (2009.01)
*H04L 1/18* (2006.01)
*H04L 1/16* (2006.01)

(52) U.S. Cl.
CPC .......... *H04L 1/1893* (2013.01); *H04L 1/1607* (2013.01); *H04L 1/187* (2013.01); *H04L 1/1812* (2013.01); *H04L 1/1854* (2013.01)

(58) Field of Classification Search
None
See application file for complete search history.

(56) References Cited

U.S. PATENT DOCUMENTS

| 2011/0261679 A1 | 10/2011 | Li et al. |
| 2011/0268064 A1 | 11/2011 | Chen et al. |

(Continued)

FOREIGN PATENT DOCUMENTS

| EP | 2 709 299 A2 | 3/2014 |
| WO | 2012/044115 A2 | 4/2012 |

OTHER PUBLICATIONS

R1-120937, 'Correction for ACK/NACK related procedure in case of TDD UL-DL configuration 0', 3GPP TSG-RAN WG1 Meeting #68, Feb. 6-10, 2012, Dresdan, Germany.

(Continued)

*Primary Examiner* — Kodzovi Acolatse
(74) *Attorney, Agent, or Firm* — Jefferson IP Law, LLP

(57) ABSTRACT

A method and an apparatus for sending Hybrid Automatic Repeat Request acknowledgement (HARQ-ACK) feedback information are provided. The User Equipment (UE) receives a Physical Downlink Control Channel (PDCCH) and a Physical Downlink Shared Channel (PDSCH) sent by a base station, determines a number of downlink subframes corresponding to the HARQ-ACK feedback information sent in the PUSCH of each CC in the current uplink subframe, the Uplink (UL) Downlink Assignment Index (UL DAI) obtained from the UL Grant of the PDCCH, a sum of the number of PDSCH subframes received from a HARQ-ACK bundling window and a number of PDCCHs indicating the downlink SPS releasing, and a size of the HARQ-ACK bundling window, and sends HARQ-ACK feedback information of each CC via the PUSCH in the current uplink subframe. A number of bits of the HARQ- (Continued)

ACK feedback information of each CC is determined according to the number of the downlink subframes.

40 Claims, 3 Drawing Sheets

(56) References Cited

U.S. PATENT DOCUMENTS

| | | |
|---|---|---|
| 2011/0310856 A1 | 12/2011 | Hariharan et al. |
| 2012/0106408 A1 | 5/2012 | Papasakellariou et al. |
| 2012/0320805 A1 | 12/2012 | Yang et al. |
| 2013/0034029 A1* | 2/2013 | Lee ........................ H04L 1/1861 370/280 |
| 2013/0242816 A1* | 9/2013 | He ........................ H04L 5/1469 370/280 |
| 2013/0336160 A1* | 12/2013 | Yin ........................ H04L 1/1854 370/254 |
| 2014/0105076 A1* | 4/2014 | Yang ................. H04W 72/0413 370/280 |
| 2014/0192688 A1* | 7/2014 | Yang .................... H04L 1/1861 370/280 |
| 2015/0103705 A1* | 4/2015 | Yang .................... H04L 1/1861 370/280 |

OTHER PUBLICATIONS

XP050601200, R1-122966, "Way Forward on HARQ-ACK transmission for TDD inter-band CA", May 25, 2012.

* cited by examiner

METHOD AND APPARATUS FOR SENDING AND RECEIVING HARQ-ACK FEEDBACK INFORMATION

CROSS-REFERENCE TO RELATED APPLICATION(S)

This application is a U.S. National Stage application under 35 U.S.C. §371 of an International application filed on Jun. 27, 2013 and assigned application number PCT/KR2013/005701, which claimed the benefit of a Chinese patent application filed on Jun. 27, 2012 in the Chinese Patent Office and assigned Serial number 201210218451.3, the entire disclosures of which are hereby incorporated by reference.

TECHNICAL FIELD

The present disclosure relates to mobile communication technologies. More particularly the present disclosure relates to a method and an apparatus for sending and receiving Hybrid Automatic Repeat Request acknowledgement (HARQ-ACK) feedback information.

BACKGROUND

Long Term Evolution (LTE) systems support two work modes: Frequency Division Duplexing (FDD) and Time Division Duplexing (TDD).

FIG. 1 is a schematic diagram illustrating a frame structure in a TDD system according to the related art.

Referring to FIG. 1, the length of each radio frame 110 is 10 ms and the radio frame 110 is divided into two half-frames 120 with the length of 5 ms each. Each half-frame 120 includes eight time slots 130 and three special fields 140. The length of each time slot 130 is 0.5 ms. The special fields 140 include a Downlink Pilot Time Slot (DwPTS), a Guard Period (GP), and an Uplink Pilot Time Slot (UpPTS). The total length of the DwPTS, GP, and UpPTS is 1 ms. Each subframe 135 consists of two continuous time slots, that is, the $K^{th}$ subframe may consist of a time slot 2k and a continuous time slot 2k+1.

The TDD system supports 7 TDD uplink-downlink configurations, as shown in Table 1. Herein, D indicates a downlink subframe, U indicates an uplink subframe, and S indicates a special subframe including the above three special fields.

TABLE 1

| Configuration number | switching point cycle | subframe number |   |   |   |   |   |   |   |   |   |
|---|---|---|---|---|---|---|---|---|---|---|---|
|   |   | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

For the purpose of improving transmission rate of users, an LTE-Advanced (LTE-A) system is provided. In the LTE-A system, a larger work bandwidth is obtained by aggregating multiple Component Carriers (CCs), i.e. uplink-downlink links of a communication system are configured via Carrier Aggregation (CA), so as to support higher transmission rates. For example, in order to support a bandwidth of 100 MHz, five CCs of 20 MHz may be aggregated. Herein, each CC is called a cell. A Base Station (BS) can configure one User Equipment (UE) to work in multiple CCs, one of which is a Primary Cell (PCC or Pcell), and others are Secondary Cells (SCCs or Scells).

FIG. 2 is a schematic diagram illustrating conventional TDD uplink-downlink configuration of each CC in the same CA according to the related art.

Referring to FIG. 2, it is defined in the LTE-A TDD system that multiple aggregated CCs use the same uplink-downlink configuration. The CA shown in FIG. 2 includes two CCs which are PCC and SCC respectively. Each of the CCs uses the same uplink-downlink configuration. In this example, subframes 0, 1, 3~6, 8 and 9 are configured as downlink subframes, subframes 2 and 7 are configured as uplink subframes.

For data received from the downlink subframe, the UE needs to perform positive acknowledgment or negative acknowledgment by sending ACK or NACK to the base station via the uplink subframe. Thus, several downlink subframes are configured into a Hybrid Automatic Repeat Request acknowledgement (HARQ-ACK) bundling window, and the HARQ-ACK feedback information of each downlink subframe in the same HARQ-ACK bundling window is sent via the same uplink subframe.

Referring to FIG. 2, subframes 4, 5, 6, and 8 of a radio frame n shown by slash lines belong to a HARQ-ACK bundling window, and the HARQ-ACK feedback information of each subframe in the HARQ-ACK bundling window will be sent via a subframe 2 of a radio frame n+1. The content "N" in the box corresponding to each subframe indicates: the HARQ-ACK feedback information of this subframe is sent via the N-th subframe from this subframe. For example, the content in the box corresponding to the subframe 4 is 8, and the eighth subframe from the subframe 4 is the subframe 2 in the radio frame n+1, thus the HARQ-ACK feedback information of the subframe 4 is sent via the subframe 2 in the radio frame n+1; for another example, the content in the box corresponding to the subframe 8 is 4, and the fourth subframe from the subframe 8 is also the subframe 2 in the radio frame n+1, thus the HARQ-ACK feedback information of the subframe 8 in radio frame n is sent via the subframe 2 in radio frame n+1.

One mode of sending the HARQ-ACK feedback information by the UE is a Physical Uplink Control Channel (PUCCH) format 3, and the PUCCH format 3 supports 5 CCs at most. The base station sends an Uplink (UL) grant via a Physical Downlink Control Channel (PDCCH), and schedules Physical Uplink Shared Channel (PUSCH) resources for the UE. The value of UL Downlink Assignment Index (DAI) in the UL grant is used to determine the number of bits used when the HARQ-ACK feedback information is transmitted via the PUCCH format 3.

It is supposed that the UE is configured with 2 CCs, the value of the UL DAI is M, and FIG. 2 is taken as an example. In this case, if a work mode of the CC is Single Input Multiple Output (SIMO), the number of bits needed by the HARQ-ACK feedback information is M; if a work mode of the CC is Multiple Input Multiple Output (MIMO), if the total number of bits of the HARQ-ACK feedback information of all CCs to be transmitted by the UE is less than or equal to N (e.g. 20), the number of bits needed by the HARQ-ACK feedback information of this CC is M*2; if a work mode of the CC is MIMO, if the total number of bits of the HARQ-ACK feedback information of all CCs to be transmitted by the UE is larger than N (e.g. 20), the number of bits needed by the HARQ-ACK feedback information of this CC is M.

Actually, when frequency domain distance between multiple CCs performing the CA is long enough, the CCs may use different TDD uplink-downlink (U-D) configurations without bringing any interference between each other. In addition, in some case, phase frequencies of different CCs may be deployed with different U-D configurations (e.g. the adjacent frequencies are configured with different Time Division-Synchronous Code Division Multiple Access (TD-SCDMA) configurations). If the same uplink-downlink configuration is used for these CCs, serious adjacent channel interference can be caused. Therefore, in subsequent research of LTE-A, an important subject is how to effectively support the case that the TDD uplink-downlink configurations of the multiple CCs of the CA are different. For example, when the TDD uplink-downlink configurations of the multiple CCs of the CA are different, how to determine the number of bits used for transmitting the HARQ-ACK feedback information in the PUSCH is a technical problem to be solved.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for sending and receiving Hybrid Automatic Repeat Request acknowledgement (HARQ-ACK) feedback information, so as to send the HARQ-ACK feedback information correctly when Time Division Duplexing (TDD) uplink-downlink (U-D) configurations of multiple Component Carriers (CCs) in Carrier Aggregation (CA) are different.

In accordance with an aspect of the present disclosure, a method for sending HARQ-ACK feedback information, so as to send the HARQ-ACK feedback information correctly when TDD uplink-downlink configurations of multiple Component Carriers in CA are different, is provided. The method includes receiving, by a User Equipment (UE), a Physical Downlink Control Channel (PDCCH) and a Physical Downlink Shared Channel (PDSCH) sent by a base station, determining, by the UE, a number of downlink subframes corresponding to HARQ-ACK feedback information sent in a Physical Uplink Shared Channel (PUSCH) of each CC in a current uplink subframe, according to at least one of the received PDCCH, an Uplink (UL) Downlink Assignment Index (UL DAI) obtained from a UL Grant of the PDCCH, a sum of a number of PDSCH subframes received from a HARQ-ACK bundling window and a number of PDCCHs indicating downlink Semi-Persistent Scheduling (SPS) releasing, and the size of the HARQ-ACK bundling window, and sending, by the UE, the HARQ-ACK feedback information of each CC via the PUSCH in the current uplink subframe, and the number of bits of the HARQ-ACK feedback information of each CC being determined according to the number of the downlink subframes.

In an implementation, the determining includes operations that:

when transmission of the PUSCH is adjusted by a PDCCH without the UL DAI field or the transmission of the PUSCH is not adjusted by a detected PDCCH, the number of downlink subframes corresponding to the HARQ-ACK feedback information sent in the PUSCH of each CC in the current uplink subframe is the size of a bundling window of the CC;

when transmission of the PUSCH is adjusted by a PDCCH with the UL DAI field, if the CC refers to HARQ-ACK Reference Timing of a TDD uplink-downlink configuration 5, the number of downlink subframes corresponding to the HARQ-ACK feedback information sent in the PUSCH of each CC in the current uplink subframe is calculated according to the following Equation 1:

$$B_c^{DL} = \min\{(W_{DAI}^{UL} + 4 * \text{ceiling}((U - W_{DAI}^{UL})/4)), M_c\} \quad \text{Equation 1}$$

In the Equation 1:

$B_c^{DL}$ is the number of downlink subframes corresponding to the HARQ-ACK feedback information sent in the PUSCH of the CC c in the current uplink subframe;

c is a sequence number of the CC;

$W_{DAI}^{UL}$ is a value of the UL DAI obtained by the UE from the UL Grant of the PDCCH;

ceiling ( ) is a rounded up function;

U is the maximum value of the $U_c$ of the CCs which are the CCs configured for the UE and refer to the HARQ-ACK Reference Timing of the TDD uplink-downlink configuration 5;

$U_c$ is a sum of the number of PDSCH subframes received from a subframe n-k of the CC c and the number of PDCCHs indicating the downlink SPS releasing;

n is a sequence number of the current uplink subframe;

k belongs to a set K which is a set of sequence numbers of downlink subframes in the HARQ-ACK bundling windows of the CC c corresponding to the uplink subframe n;

$M_c$ is the size of the HARQ-ACK bundling window of the CC c;

when transmission of the PUSCH is adjusted by the PDCCH with the UL DAI field, if the CC refers to HARQ-ACK Reference Timing of a TDD uplink-downlink configuration 0, 1, 2, 3, 4, 6, the $B_c^{DL}$ is equal to $\min\{W_{DAI}^{UL}, M_c\}$.

In an implementation, the determining includes operations that:

when transmission of the PUSCH is adjusted by a PDCCH without the UL DAI field or the transmission of the PUSCH is not adjusted by a detected PDCCH, the number of downlink subframes corresponding to the HARQ-ACK feedback information sent in the PUSCH of each CC in the current uplink subframe is the size of a bundling window of the CC;

when transmission of the PUSCH is adjusted by the PDCCH with the UL DAI field, if the CC refers to HARQ-ACK Reference Timing of a TDD uplink-downlink configuration 5, the number of downlink subframes corresponding to the HARQ-ACK feedback information sent in the PUSCH of each CC in the current uplink subframe is calculated according to the following Equation 2:

$$B_c^{DL} = \min\{(W_{DAI}^{UL} + 4 * \text{ceiling}((U_c - W_{DAI}^{UL})/4)), M_c\} \quad \text{Equation 2}$$

In the Equation 2:

$B_c^{DL}$ is the number of downlink subframes corresponding to the HARQ-ACK feedback information sent in the PUSCH of the CC c in the current uplink subframe;

c is a sequence number of the CC;

$W_{DAI}^{UL}$ is a value of the UL DAI obtained by the UE from the UL Grant of the PDCCH;

ceiling ( ) is a rounded up function;

$U_c$ is a sum of the number of PDSCH subframes received from a subframe n-k of the CC c and the number of PDCCHs indicating the downlink SPS releasing;

n is a sequence number of the current uplink subframe;

k belongs to a set K which is a set of sequence numbers of downlink subframes in the HARQ-ACK bundling windows of the CC c corresponding to the uplink subframe n;

$M_c$ is the size of the HARQ-ACK bundling window of the CC c;

when transmission of the PUSCH is adjusted by the PDCCH with the UL DAI field, if the CC refers to HARQ-ACK Reference Timing of a TDD uplink-downlink configuration 0, 1, 2, 3, 4, or 6, the $B_c^{DL}$ is equal to $\min\{W_{DAI}^{UL}, M_c\}$.

In an implementation, the determining includes operations that:

when transmission of the PUSCH is adjusted by a PDCCH without the UL DAI field or the transmission of the PUSCH is not adjusted by a detected PDCCH, the number of downlink subframes corresponding to the HARQ-ACK feedback information sent in the PUSCH of each CC in the current uplink subframe is the size of a bundling window of the CC;

when transmission of the PUSCH is adjusted by the PDCCH with the UL DAI field, if all CCs configured for the UE comprises one or more CCs referring to HARQ-ACK Reference Timing of a TDD uplink-downlink configuration 5, the number of downlink subframes corresponding to the HARQ-ACK feedback information sent in the PUSCH of each of the CCs configured for the UE in the current uplink subframe is calculated according to the following Equation 3:

$$B_c^{DL} = \min\{(W_{DAI}^{UL} + 4 * \text{ceiling}((U - W_{DAI}^{UL})/4)), M_c\} \quad \text{Equation 3}$$

In the Equation 3:

$B_c^{DL}$ is the number of downlink subframes corresponding to the HARQ-ACK feedback information sent in the PUSCH of the CC c in the current uplink subframe;

c is a sequence number of the CC;

$W_{DAI}^{UL}$ is a value of the UL DAI obtained by the UE from the UL Grant of the PDCCH;

ceiling ( ) is a rounded up function;

U is the maximum value of the $U_c$ of all CCs configured for the UE;

$U_c$ is a sum of the number of PDSCH subframes received from a subframe n-k of the CC c and the number of PDCCHs indicating the downlink SPS releasing;

n is a sequence number of the current uplink subframe;

k belongs to a set K which is a set of sequence numbers of downlink subframes in the HARQ-ACK bundling windows of the CC c corresponding to the uplink subframe n;

$M_c$ is the size of the HARQ-ACK bundling window of the CC c;

when transmission of the PUSCH is adjusted by the PDCCH with the UL DAI field, if none of the CCs configured for the UE refers to HARQ-ACK Reference Timing of a TDD uplink-downlink configuration 5, the $B_c^{DL}$ is equal to $\min\{W_{DAI}^{UL}, M_c\}$ for all the CCs configured for the UE.

In an implementation, the determining includes operations that:

when transmission of the PUSCH is adjusted by a PDCCH without the UL DAI field or the transmission of the PUSCH is not adjusted by a detected PDCCH, the number of downlink subframes corresponding to the HARQ-ACK feedback information sent in the PUSCH of each CC in the current uplink subframe is the size of a bundling window of the CC;

when transmission of the PUSCH is adjusted by the PDCCH with the UL DAI field, if all CCs configured for the UE comprises one or more CCs referring to HARQ-ACK Reference Timing of a TDD uplink-downlink configuration 5, $B_c^{DL}$ is equal to $M_c$ for all the CCs;

when transmission of the PUSCH is adjusted by the PDCCH with the UL DAI field, if none of the CCs configured for the UE refers to HARQ-ACK Reference Timing of a TDD uplink-downlink configuration 5, $B_c^{DL}$ is equal to $\min\{W_{DAI}^{UL}, M_c\}$ for all the CCs;

$M_c$ is the size of the HARQ-ACK bundling window of the CC c;

$B_c^{DL}$ is the number of downlink subframes corresponding to the HARQ-ACK feedback information sent in the PUSCH of the CC c in the current uplink subframe;

$W_{DAI}^{UL}$ is a value of the UL DAI obtained by the UE from the UL Grant of the PDCCH.

In an implementation, the determining includes operations that:

when transmission of the PUSCH is adjusted by a PDCCH without the UL DAI field or the transmission of the PUSCH is not adjusted by a detected PDCCH, the number of downlink subframes corresponding to the HARQ-ACK feedback information sent in the PUSCH of each CC in the current uplink subframe is the size of a bundling window of the CC;

when transmission of the PUSCH is adjusted by the PDCCH with the UL DAI field, if all CCs configured for the UE comprises one or more CCs referring to HARQ-ACK Reference Timing of a TDD uplink-downlink configuration 5, $B_c^{DL}$ is equal to $M_c$ for the CC referring to the HARQ-ACK Reference Timing of the TDD uplink-downlink configuration 5; or $B_c^{DL}$ is equal to $\min\{W_{DAI}^{UL}, M_c\}$ for the CC referring to the HARQ-ACK Reference Timing of the TDD uplink-downlink configuration 0, 1, 2, 3, 4, 6;

when transmission of the PUSCH is adjusted by the PDCCH with the UL DAI field, if none of CCs configured for the UE refers to HARQ-ACK Reference Timing of a TDD uplink-downlink configuration 5, $B_c^{DL}$ is equal to $\min\{W_{DAI}^{UL}, M_c\}$ for all the CCs;

$M_c$ is the size of the HARQ-ACK bundling window of the CC c;

$B_c^{DL}$ is the number of downlink subframes corresponding to the HARQ-ACK feedback information sent in the PUSCH of the CC c in the current uplink subframe;

$W_{DAI}^{UL}$ is a value of the UL DAI obtained by the UE from the UL Grant of the PDCCH.

In an implementation, the determining the number of bits of the HARQ-ACK feedback information of each CC according to the number of the downlink subframes includes:

when a transmission mode of the CC c is Single Input Multiple Output (SIMO), or when a transmission mode of the CC c is Multiple Input Multiple Output (MIMO) and spatial bundling is performed for the HARQ-ACK feedback of the CC c, $O_c^{ACK} = B_c^{DL}$;

when a transmission mode of the CC c is MIMO and spatial bundling is not performed for the HARQ-ACK feedback of the CC c, $O_c^{ACK} = 2 * B_c^{DL}$;

$O_c^{ACK}$ is the number of bits of the HARQ-ACK feedback information of the CC c.

In accordance with another aspect of the present disclosure, an apparatus of a User Equipment (UE) for sending Hybrid Automatic Repeat Request acknowledgement (HARQ-ACK) feedback information is provided, when Time Division Duplexing (TDD) uplink-downlink configurations of multiple Component Carriers (CCs) in Carrier Aggregation (CA) configured for the UE are different. The apparatus includes a downlink receiver configured to receive a Physical Downlink Control Channel (PDCCH) and a Physical Downlink Shared Channel (PDSCH) sent by a base station, a controller configured to determine a number of downlink subframes corresponding to HARQ-ACK feedback information sent in a Physical Uplink Shared Channel (PUSCH) of each CC in a current uplink subframe, according to at least one of the received PDCCH, an Uplink (UL) Downlink Assignment Index (UL DAI) obtained from a UL Grant of the PDCCH, a sum of a number of PDSCH subframes received from a HARQ-ACK bundling window and a number of PDCCHs indicating downlink Semi-Persistent Scheduling (SPS) releasing, and a size of the HARQ-ACK bundling window, and an uplink transmitter configured to send the HARQ-ACK feedback information of each CC via the PUSCH in the current uplink subframe, and a number of bits of the HARQ-ACK feedback information of each CC being determined according to the number of the downlink subframes.

In accordance with another aspect of the present disclosure, a method for receiving Hybrid Automatic Repeat Request acknowledgement (HARQ-ACK) feedback information is provided, when Time Division Duplexing (TDD) uplink-downlink configurations of multiple Component Carriers (CCs) in Carrier Aggregation (CA) configured for User Equipment (UE) are different. The method includes transmitting, by a Base Station (BS), a Physical Downlink Control Channel (PDCCH) and a Physical Downlink Shared Channel (PDSCH) to the UE, determining, by the BS, a number of downlink subframes corresponding to HARQ-ACK feedback information sent in a Physical Uplink Shared Channel (PUSCH) of each CC in a current uplink subframe, according to at least one of the PDCCH, an Uplink (UL) Downlink Assignment Index (UL DAI) included in a UL Grant of the PDCCH, a sum of a number of PDSCH subframes received from a HARQ-ACK bundling window and a number of PDCCHs indicating downlink Semi-Persistent Scheduling (SPS) releasing, and a size of the HARQ-ACK bundling window, and receiving, by the BS, HARQ-ACK feedback information of each CC via the PUSCH in the current uplink subframe. The number of bits of the HARQ-ACK feedback information of each CC is determined according to the number of the downlink subframes.

In accordance with another aspect of the present disclosure, an apparatus of a Base Station (BS) for receiving Hybrid Automatic Repeat Request acknowledgement (HARQ-ACK) feedback information is provided, when Time Division Duplexing (TDD) uplink-downlink (U-D) configurations of multiple Component Carriers (CCs) in Carrier Aggregation (CA) configured for User Equipment (UE) are different. The apparatus includes a downlink transmitter configured to transmit a Physical Downlink Control Channel (PDCCH) and a Physical Downlink Shared Channel (PDSCH) to the UE, a controller configured to determine a number of downlink subframes corresponding to HARQ-ACK feedback information sent in a Physical Uplink Shared Channel (PUSCH) of each CC in a current uplink subframe, according to at least one of the PDCCH, an Uplink (UL) Downlink Assignment Index (UL DAI) included in a UL Grant of the PDCCH, a sum of a number of PDSCH subframes received from a HARQ-ACK bundling window and a number of PDCCHs indicating downlink Semi-Persistent Scheduling (SPS) releasing, and a size of the HARQ-ACK bundling window, and an uplink receiver configured to receive HARQ-ACK feedback information of each CC via the PUSCH in the current uplink subframe. The number of bits of the HARQ-ACK feedback information of each CC is determined according to the number of the downlink subframes.

As can be seen from the above solutions, according to the method for sending HARQ-ACK feedback information provided by the embodiments of the present disclosure, when the TDD uplink-downlink configurations of multiple CCs in CA are different, the UE first determines the number of downlink subframes corresponding to the HARQ-ACK feedback information sent in the PUSCH of each CC in the current uplink subframe, according to at least one of the received PDCCH, the UL DAI obtained from the UL Grant of the PDCCH, the sum of the number of PDSCH subframes received from the HARQ-ACK bundling window and the number of PDCCHs indicating the downlink SPS releasing, and the size of the HARQ-ACK bundling window, and then determines the number of bits of the HARQ-ACK feedback information of each CC according to the number of the downlink subframes. Therefore, not only the HARQ-ACK feedback information can be transmitted correctly in the CA system in which the TDD uplink-downlink configurations of multiple CCs are different, but also the waste of PUSCH resources are avoided, and the case in which the TDD uplink-downlink configurations of the multiple CCs in the CA are different is effectively supported to satisfy the requirements of TDD uplink-downlink configurations of CC in different scenes.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In a Long Term Evolution (LTE)-Advanced (LTE-A) Time Division Duplexing (TDD) system configured with Carrier Aggregation (CA), TDD uplink-downlink (U-D) configurations of multiple Component Carriers (CCs) in a base station may be different in the embodiments of the present disclosure.

Figure 1:
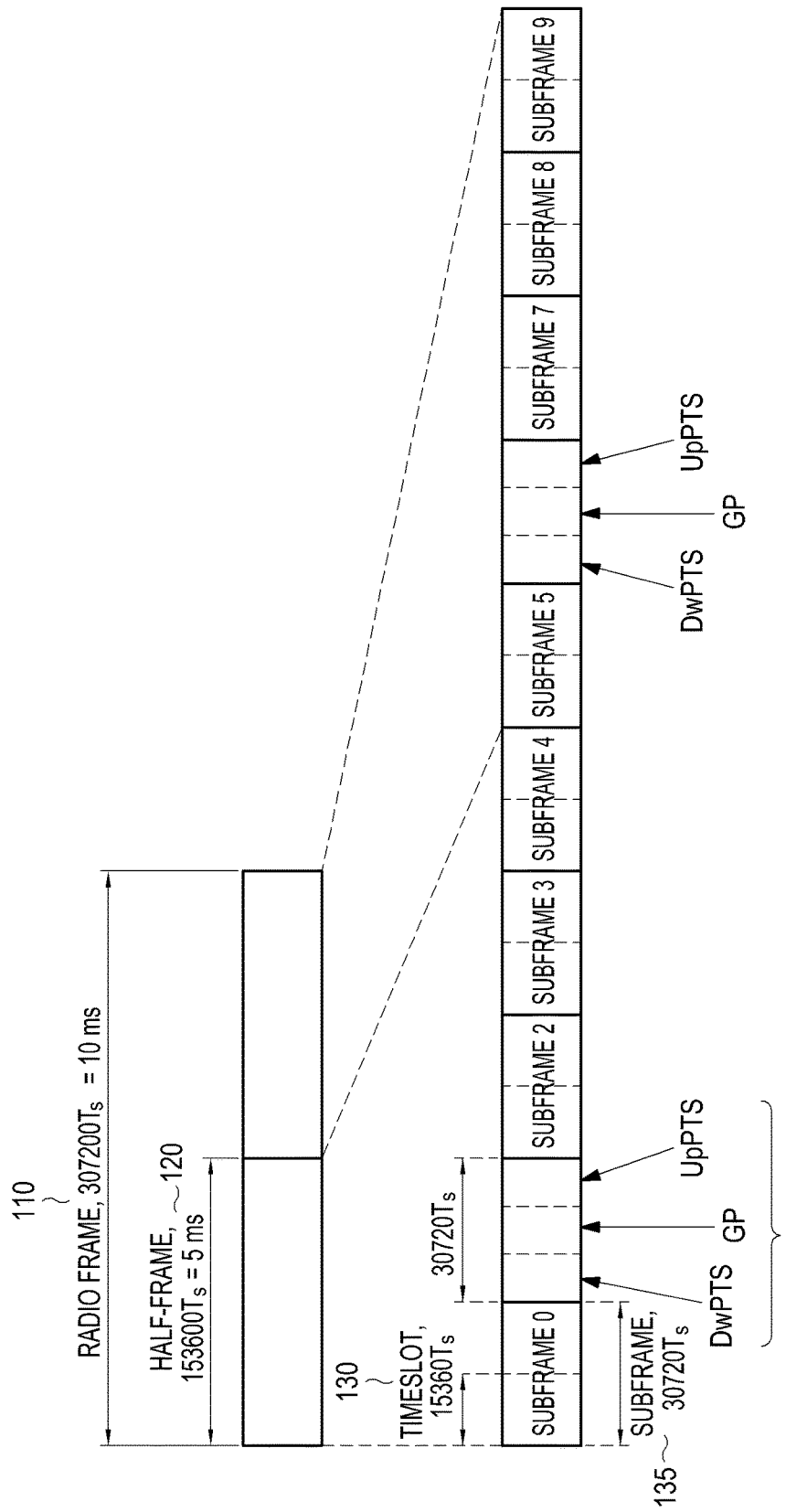
FIG. 1 is a schematic diagram illustrating the structure of a frame in a Time Division Duplexing (TDD) system according to the related art.
Figure 2:
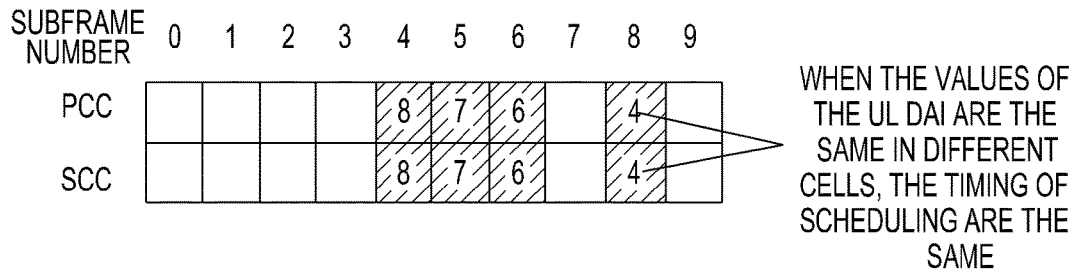
FIG. 2 is a schematic diagram illustrating conventional TDD uplink-downlink configuration of each Component Carrier (CC) in the same Carrier Aggregation (CA) according to the related art.
Figure 3:
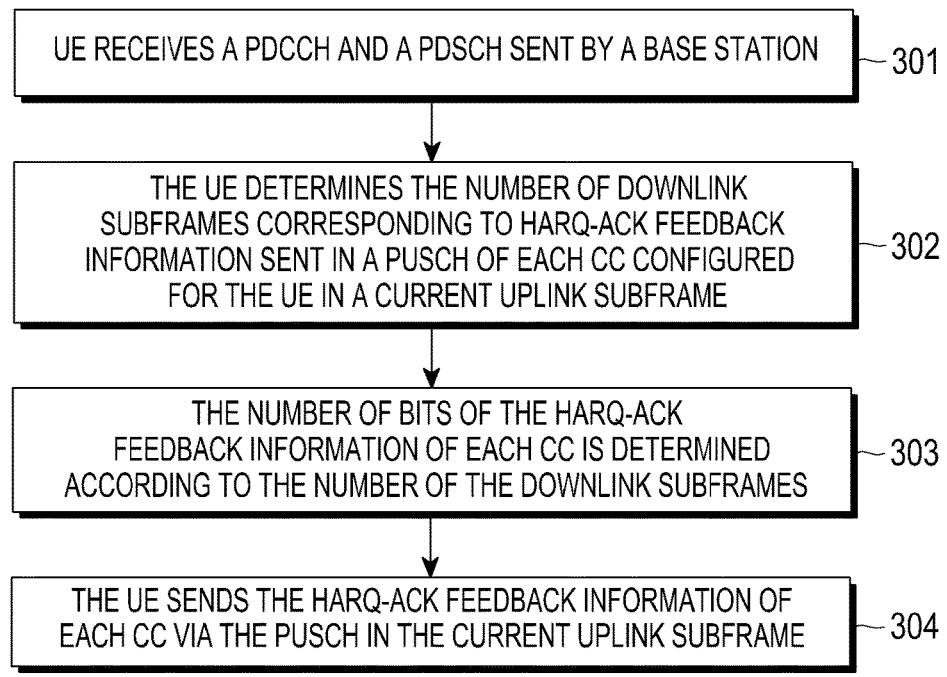
FIG. 3 is a schematic flowchart illustrating a method for sending Hybrid Automatic Repeat Request acknowledgement (HARQ-ACK) feedback information according to an embodiment of the present disclosure.

FIG. 3 is a schematic flowchart illustrating a method for sending Hybrid Automatic Repeat Request acknowledgement (HARQ-ACK) feedback information according to an embodiment of the present disclosure.

Referring to FIG. 3, the flow includes the following operations.

In operation 301, a User Equipment (UE) receives a Physical Downlink Control Channel (PDCCH) and a Physical Downlink Shared Channel (PDSCH) sent by a base station.

In operation 302, the UE determines the number of downlink subframes corresponding to HARQ-ACK feedback information sent in a Physical Uplink Shared Channel (PUSCH) of each CC configured for the UE in a current uplink subframe, according to at least one of the received PDCCH, an uplink (UL) Downlink Assignment Index (DAI) obtained from a UL Grant of the PDCCH, a sum of the number of PDSCH subframes received from a HARQ-ACK bundling window and the number of PDCCHs for indicating the downlink Semi-Persistent Scheduling (SPS) releasing, and the size of the HARQ-ACK bundling window.

In operation 303, the UE determines the number of bits of the HARQ-QCK feedback information according to the number of down link subframes. In operation 304, the UE sends the HARQ-ACK feedback information of each CC via the PUSCH in the current uplink subframe.

The embodiments of the present disclosure provide four preferable modes for implementing the block 302. The preferable methods used by the UE for determining the number of downlink subframes corresponding to the HARQ-ACK feedback information sent in the PUSCH of each CC in the current uplink subframe will be described in detail.

The first method is provided.

In the first case, when transmission of the PUSCH is adjusted by a PDCCH without the UL DAI field or the transmission of the PUSCH is not adjusted by a detected PDCCH, the number of downlink subframes corresponding to the HARQ-ACK feedback information sent in the PUSCH of each CC configured for the UE in the current uplink subframe is the size of a bundling window of the CC.

Some terms in the embodiments of the present disclosure are described briefly.

The HARQ-ACK bundling window size is defined as the size of the bundling window used for sending the HARQ-ACK feedback information in the PUCCH when the CAs have different TDD uplink-downlink configurations. The bundling window used for sending the HARQ-ACK feedback information in the PUCCH may be different for different cells and or different carriers. In the embodiments of the present disclosure, when being used for sending the HARQ-ACK feedback information in the PUSCH, the bundling window is the same as that corresponding to the PUCCH.

The transmission of the PUSCH being adjusted by the PDCCH without the UL DAI refers to that the PDCCH scheduling the PUSCH data does not include the UL DAI field. For example, when the PUSCH of the CC transmitting the PUSCH data performs the scheduling according to HARQ-ACK Reference Timing of a TDD uplink-downlink configuration 0, the PDCCH scheduling the PUSCH data does not include the UL DAI field.

The transmission of the PUSCH being adjusted by the detected PDCCH refers to the transmission of the PUSCH data is scheduled by the PDCCH, the transmission of the PUSCH being not adjusted by the detected PDCCH refers to the transmission of the PUSCH data does not need to be scheduled by the PDCCH, for example, SPS services and non-adaptive retransmission services.

The relation between the HARQ-ACK Reference Timing referred by a certain CC and the TDD uplink-downlink configuration of the CC includes that: when the TDD uplink-downlink configurations used by the multiple CCs configured for the UE include two different TDD uplink-downlink configurations, for example, a configuration A and a configuration B respectively, the UE obtains two backwards compatible TDD uplink-downlink configurations C1 and C2 via mapping the configurations A and B, and C1 or C2 may be any of seven conventional TDD uplink-downlink configurations. Thus, the CC with the configuration A as the TDD uplink-downlink configuration refers to the HARQ-ACK Reference Timing of the TDD uplink-downlink configuration C1, the CC with the configuration B as the TDD uplink-downlink configuration refers to the HARQ-ACK Reference Timing of the TDD uplink-downlink configuration C2.

The value of the UL DAI is a reference value used for calculating the number of bits of the HARQ-ACK feedback information of each CC which sends the HARQ-ACK feedback information in the PUSCH of the same uplink subframe.

In the following descriptions of the present disclosure, each CC configured for the UE is recorded as CC c; the current uplink subframe is recorded as uplink subframe n; the number of downlink subframes corresponding to the HARQ-ACK feedback information sent via the PUSCH of the CC c in the uplink subframe n is recorded as $B_c^{DL}$; and the size of the bundling window of the CC c is recorded as $M_c$.

In the above case 1, $B_c^{DL}$ is equal to $M_c$.

In the second case, when transmission of the PUSCH is adjusted by a PDCCH with the UL DAI field, because the TDD uplink-downlink configuration 5 only has one uplink subframe, the HARQ-ACK feedback information of all downlink subframes needs to be transmitted via the PUSCH of this uplink subframe, while the length of the UL DAI field is only 2 bits which can only indicate 4 different values, and thus the TDD uplink-downlink configuration 5 and the TDD uplink-downlink configurations 0, 1, 2, 3, 4, 6 are processed respectively in the embodiments of the present disclosure.

Specifically, if the CC refers to HARQ-ACK Reference Timing of the TDD uplink-downlink configuration 5, the first processing mode includes calculating the $B_c^{DL}$ of the CC according to the following Equation 1:

$$B_c^{DL}=\min\{(W_{DAI}^{UL}+4*\text{ceiling}((U-W_{DAI}^{UL})/4)),M_c\} \quad \text{Equation 1}$$

Herein, $W_{DAI}^{UL}$ is the value of the UL DAI obtained by the UE from the UL Grant of the PDCCH; ceiling ( ) is a rounded up function; U is the maximum value of the U of the CCs which are the CCs configured for the UE and refer to the HARQ-ACK Reference Timing of the TDD uplink-downlink configuration 5; $U_c$ is a sum of the number of PDSCH subframes received by the UE from a subframe n-k of the CC c and the number of PDCCHs indicating the downlink SPS releasing; k belongs to a set K, the set K is a set of sequence numbers of downlink subframes in HARQ-ACK bundling windows of the CC c corresponding to the uplink subframe n; and $M_c$ is the size of the bundling window of the CC c.

If the CC refers to the HARQ-ACK Reference Timing of the TDD uplink-downlink configuration 5, the second processing mode includes calculating the $B_c^{DL}$ of the CC according to the following Equation 2:

$$B_c^{DL}=\min\{(W_{DAI}^{UL}+4*\text{ceiling}((U_c-W_{DAI}^{UL})/4)),M_c\} \quad \text{Equation 2}$$

Herein, $W_{DAI}^{UL}$ is the value of the UL DAI obtained by the UE from the UL Grant of the PDCCH; ceiling ( ) is a rounded up function; $U_c$ is a sum of the number of PDSCH subframes received by the UE from a subframe n-k of the CC c and the number of PDCCHs indicating the downlink SPS releasing; k belongs to a set K, the set K is a set of sequence numbers of downlink subframes in the HARQ-ACK bundling windows of CC c corresponding to the uplink subframe n; and $M_c$ is the size of the bundling window of the CC c.

If the CC refers to the HARQ-ACK Reference Timing of the TDD uplink-downlink configuration 0, 1, 2, 3, 4, or 6, the $B_c^{DL}$ of the CC is equal to $\min\{W_{DAI}^{UL}, M_c\}$.

In the following block 303, the number of bits of the HARQ-ACK feedback information of each CC c configured for the UE in the PUSCH of the uplink subframe n configured for the UE (which is recorded as $O_c^{ACK}$). Specifically, when a transmission mode of the CC c is SIMO, or when a transmission mode of the CC c is Multiple Input Multiple Output (MIMO) and spatial bundling is performed for the HARQ-ACK feedback of the CC c, $O_c^{ACK}=B_c^{DL}$; when a transmission mode of the CC c is MIMO and spatial bundling is not performed for the HARQ-ACK feedback of the CC c, $O_c^{ACK}=2*B_c^{DL}$.

Whether the spatial bundling is performed for the HARQ-ACK feedback information of the CC with the MIMO transmission mode and how to perform the spatial bundling is not limited in the embodiments of the present disclosure.

After the number of bits of the HARQ-ACK feedback information of each CC is determined, the HARQ-ACK feedback information of each CC may be arranged in sequence. In one mode, the HARQ-ACK feedback information of the CC is arranged in sequence according to an index sequence of the CC; in another mode, the HARQ-ACK feedback information of the CCs referring to the HARQ-ACK Reference Timing of the TDD uplink-downlink configurations 0, 1, 2, 3, 4, or 6 is arranged in sequence according to an index sequence of the CCs, and then the HARQ-ACK feedback information of the CC referring to the HARQ-ACK Reference Timing referring of the TDD uplink-downlink configuration 5 is arranged after the HARQ-ACK feedback information of the CCs referring to the HARQ-ACK Reference Timing referring to of the TDD uplink-downlink configurations 0, 1, 2, 3, 4, or 6.

The first method is described by taking the first embodiment as an example.

In the first embodiment, it is supposed that the base station configures 2 CCs for the UE, and the 2 CCs are a Primary Cell (PCC) and a Secondary Cell (SCC) respectively. The PCC uses the TDD uplink-downlink configuration 2, and the SCC uses the TDD uplink-downlink configuration 5. In this case, the HARQ-ACK Reference Timing of the PCC refers to the HARQ-ACK Reference Timing of the TDD uplink-downlink configuration 2, and the HARQ-ACK Reference Timing of the SCC refers to the HARQ-ACK Reference Timing of the TDD uplink-downlink configuration 5. The bundling window of the PCC includes subframes {4,5,6,8}, and the bundling window size is 4, the bundling window of the SCC includes subframes {9,0,1,3,4,5,6,7,8}, and the bundling window size is 9, the UL Grant scheduling the PUSCH is sent via the subframe 8 of the SCC, and $W_{DAI}^{UL}$=3. This case belongs to the second case in the first method.

The PCC uses the TDD uplink-downlink configuration 2, the $B_c^{DL}$ of the PCC is equal to $\min\{W_{DAI}^{UL}, M_c\}=\min\{3,4\}=3$, it is supposed that the PCC uses the transmission mode of Single Input Multiple Output (SIMO), then the number of bits of the HARQ-ACK feedback information of the PCC is $O_c^{ACK}=B_c^{DL}=3$.

The SCC uses the TDD uplink-downlink configuration 5, because only one CC with the TDD uplink-downlink configuration 5 is configured for the UE, the first and second processing modes corresponding to the TDD uplink-downlink configuration 5 are equivalent to each other, and any of Equation 1 and Equation 2 may be used. It is supposed that the Equation 1 is used, thus the $B_c^{DL}$ of the CC is equal to $\min\{(W_{DAI}^{UL}+4*\text{ceiling}((U-W_{DAI}^{UL})/4)), M_c\}$. It is supposed that the sum of the number of PDSCH subframes received from the subframe n-k of SCC and the number of PDCCHs indicating downlink SPS releasing is 6, thus $B_c^{DL}=\min\{(W_{DAI}^{UL}+4*\text{ceiling}((U-W_{DAI}^{UL})/4)), M_c\}=\min\{(3+4*\text{ceiling}(6-3)/4)), 9\}=7$.

It is supposed that the SCC uses the transmission mode of MIMO and the spatial bundling is not performed for the HARQ-ACK feedback information, then the number of bits of the HARQ-ACK feedback information of the SCC is $O_c^{ACK}=2*B_c^{DL}=2*7=14$.

The second method is provided.

In the first case, when the transmission of the PUSCH is adjusted by the PDCCH without the UL DAI field or the transmission of the PUSCH is not adjusted by the detected PDCCH, the number of downlink subframes corresponding to the HARQ-ACK feedback information sent via the PUSCH of each CC configured for the UE in the current uplink subframe is the bundling window size of the CC, i.e. $B_c^{DL}$ is equal to $M_c$.

In the second case, when the transmission of the PUSCH is adjusted by the PDCCH with the UL DAI field, when all CCs configured for the UE include one or more CCs referring to the HARQ-ACK Reference Timing of the TDD uplink-downlink configuration 5, the $B_c^{DL}$ is calculated via Equation 31 for all the CCs including the CCs referring to the HARQ-ACK Reference Timing referring to of the TDD uplink-downlink configuration 5 and the CCs referring to the HARQ-ACK Reference Timing of the TDD uplink-downlink configurations 0, 1, 2, 3, 4, 6:

$$B_c^{DL}=\min\{(W_{DAI}^{UL}+4*\text{ceiling}((U-W_{DAI}^{UL})/4)),M_c\} \quad \text{Equation (3)}$$

Herein, $W_{DAI}^{UL}$ is the value of the UL DAI obtained by the UE from the UL Grant of the PDCCH; ceiling ( ) is a rounded up function; U is the maximum value of the $U_c$ of all CCs configured for the UE; $U_c$ is a sum of the number of PDSCH subframes received by the UE from the subframe n-k of the CC c and the number of PDCCHs indicating downlink SPS releasing; k belongs to a set K, the set K is a set of sequence numbers of downlink subframes in HARQ-ACK bundling windows of CC c corresponding to the uplink subframe n; and $M_c$ is the size of the bundling window of the CC c.

In the third case, when the transmission of the PUSCH is adjusted by the PDCCH with the UL DAI field, when none of CCs configured for the UE refers to the HARQ-ACK Reference Timing of the TDD uplink-downlink configuration 5, the $B_c^{DL}$ is equal to $\min\{W_{DAI}^{UL}, M_c\}$ for all the CCs. Herein, $W_{DAI}^{UL}$ is the value of the UL DAI obtained by the UE from the UL Grant of the PDCCH, and $M_c$ is the size of the bundling window of the CC c.

The processing in the following step 303 is the same as that in the first method, which will not be described herein.

The second method is described by taking the second embodiment as an example.

In the second embodiment, it is supposed that the base station configures 2 CCs for the CA UE, and the 2 CCs are a PCC and a SCC respectively. The PCC uses the TDD uplink-downlink configuration 2, and the SCC uses the TDD uplink-downlink configuration 5. In this case, the HARQ-ACK Reference Timing of the PCC refers to the HARQ-ACK Reference Timing of the TDD uplink-downlink configuration 2, and the HARQ-ACK Reference Timing of the SCC refers to the HARQ-ACK Reference Timing of the TDD uplink-downlink configuration 5. The bundling window of the PCC includes subframes {4,5,6,8}, and the bundling window size is 4, the bundling window of the SCC includes subframes {9,0,1,3,4,5,6,7,8}, and the bundling window size is 9, the UL Grant for scheduling the PUSCH is sent via the subframe 8 of the SCC, and $W_{DAI}^{UL}=1$. This case belongs to the second case in the second method, and Equation 1 is used to perform the calculation.

The PCC uses the TDD uplink-downlink configuration 2, the $B_c^{DL}$ of the PCC is equal to $\min\{(W_{DAI}^{UL}+4*\text{ceiling}((U-W_{DAI}^{UL})/4)), M_c\}$, it is supposed that the sum of the number of PDSCH subframes received from the subframe n-k of the PCC and the number of PDCCHs indicating downlink SPS releasing is 2 and the sum of the number of PDSCH subframes received from the subframe n-k of the SCC and the number of PDCCHs indicating downlink SPS releasing is 6, thus $U=\max\{Uc\}=\max\{2, 6\}=6$, and $B_c^{DL}=\min\{(W_{DAI}^{UL}+4*\text{ceiling}((U-W_{DAI}^{UL})/4)), M_c\}=\min\{(1+4*\text{ceiling}((6-1)/4)), 4\}=4$.

It is supposed that the PCC uses the transmission mode of SIMO, then the number of bits of the HARQ-ACK feedback information of the PCC is $O_c^{ACK}=B_c^{DL}=4$.

The SCC uses the TDD uplink-downlink configuration 5, the $B_c^{DL}$ of the SCC is equal to $\min\{(W_{DAI}^{UL}+4*\text{ceiling}((U-W_{DAI}^{UL})/4)), M_c\}$, $U=\max\{Uc\}=\max\{2, 6\}=6$, and thus $B_c^{DL}=\min\{(W_{DAI}^{UL}+4*\text{ceiling}((U-W_{DAI}^{UL})/4)), M_c\}=\min\{(1+4*\text{ceiling}((6-1)/4)), 9\}=9$. It is supposed that the SCC uses the transmission mode of MIMO and the spatial bundling is performed for the HARQ-ACK feedback information, then the number of bits of the HARQ-ACK feedback information of the SCC is $O_c^{ACK}=B_c^{DL}=9$.

The third method is provided.

In the first case, when the transmission of the PUSCH is adjusted by the PDCCH without the UL DAI field or the transmission of the PUSCH is not adjusted by the detected PDCCH, the number of downlink subframes corresponding to the HARQ-ACK feedback information sent via the PUSCH of each CC configured for the UE in the current uplink subframe is the size of the bundling window of the CC, i.e. $B_c^{DL}$ is equal to $M_c$.

In the second case, when the transmission of the PUSCH is adjusted by the PDCCH with the UL DAI field and when all CCs configured for the UE include one or more CCs referring to the HARQ-ACK Reference Timing of the TDD uplink-downlink configuration 5, $B_c^{DL}$ is equal to $M_c$ for all CCs.

In the third case, when the transmission of the PUSCH is adjusted by the PDCCH with the UL DAI field and none of the CCs configured for the UE refers to the HARQ-ACK Reference Timing of the TDD uplink-downlink configuration 5, $B_c^{DL}$ is equal to $\min\{W_{DAI}^{UL}, M_c\}$ for all CCs. Herein, $W_{DAI}^{UL}$ is the value of the UL DAI obtained by the UE from the UL Grant of the PDCCH, and $M_c$ is the size of the bundling window of the CC c.

The processing in the following step 303 is the same as that in the first method, which will not be described herein.

The third method is described by taking the third embodiment as an example.

In the third embodiment, it is supposed that the base station configures 2 CCs for the CA UE, and the 2 CCs are a PCC and a SCC respectively. The PCC uses the TDD uplink-downlink configuration 2, and the SCC uses the TDD uplink-downlink configuration 5. In this case, the HARQ-ACK Reference Timing of the PCC refers to the HARQ-ACK Reference Timing of the TDD uplink-downlink configuration 2, and the HARQ-ACK Reference Timing of the SCC refers to the HARQ-ACK Reference Timing of the TDD uplink-downlink configuration 5. The bundling window of the PCC includes subframes {4,5,6,8}, and the bundling window size is 4, the bundling window of the SCC includes subframes {9,0,1,3,4,5,6,7,8}, and the bundling window size is 9, the UL Grant for scheduling the PUSCH is sent via the subframe 8 of the SCC, and $W_{DAI}^{UL}=1$. This case belongs to the second case in the second method.

The PCC uses the TDD uplink-downlink configuration 2, the $B_c^{DL}$ of the PCC is equal to $M_c=4$. It is supposed that the PCC uses the transmission mode of SIMO, then the number of bits of the HARQ-ACK feedback information of the PCC is $O_c^{ACK}=B_c^{DL}=4$.

The SCC uses the TDD uplink-downlink configuration 5, the $B_c^{DL}$ of the SCC is equal to $M_c=9$. It is supposed that the SCC uses the transmission mode of SIMO, then the number of bits of the HARQ-ACK feedback information of the SCC is $O_c^{ACK}=B_c^{DL}=9$.

The fourth method is provided.

In the first case, when the transmission of the PUSCH is adjusted by the PDCCH without the UL DAI field or the transmission of the PUSCH is not adjusted by the detected PDCCH, the number of downlink subframes corresponding to the HARQ-ACK feedback information sent in the PUSCH of each CC configured for the UE in the current uplink subframe is the size of the bundling window of the CC, i.e. $B_c^{DL}$ is equal to $M_c$.

In the second case, when the transmission of the PUSCH is adjusted by the PDCCH with the UL DAI field and when all CCs configured for the UE include one or more CCs referring to the HARQ-ACK Reference Timing of the TDD uplink-downlink configuration 5, for the CC referring to the HARQ-ACK Reference Timing of the TDD uplink-downlink configuration 5, $B_c^{DL}$ is equal to $M_c$; for the CC referring to the HARQ-ACK Reference Timing of the TDD uplink-downlink configuration 0, 1, 2, 3, 4, or 6, $B_c^{DL}$ is equal to min{$W_{DAI}^{UL}$, $M_c$}; herein, $W_{DAI}^{UL}$ is the value of the UL DAI obtained by the UE from the UL Grant of the PDCCH, $M_c$ is the size of the bundling window of the CC c.

In the third case, when the transmission of the PUSCH is adjusted by the PDCCH with the UL DAI field, when none of CCs configured for the UE refers to the HARQ-ACK Reference Timing of the TDD uplink-downlink configuration 5, the $B_c^{DL}$ is equal to min{$W_{DAI}^{UL}$, $M_c$} for all the CCs. Herein, $W_{DAI}^{UL}$ is the value of the UL DAI obtained by the UE from the UL Grant of the PDCCH, $M_c$ is the bundling window size of the CC c.

The processing in the following step 303 is the same as that in the first method, which will not be described herein.

The fourth method is described by taking the fourth embodiment as an example.

In the fourth embodiment, it is supposed that the base station configures 2 CCs for the CA UE, and the 2 CCs are a PCC and a SCC respectively. The PCC uses the TDD uplink-downlink configuration 2, and the SCC uses the TDD uplink-downlink configuration 5. In this case, the HARQ-ACK Reference Timing of the PCC refers to the HARQ-ACK Reference Timing of the TDD uplink-downlink configuration 2, and the HARQ-ACK Reference Timing of the SCC refers to the HARQ-ACK Reference Timing of the TDD uplink-downlink configuration 5. The bundling window of the PCC includes subframes {4,5,6,8}, and the bundling window size is 4, the bundling window of the SCC includes subframes {9,0,1,3,4,5,6,7,8}, and the bundling window size is 9, the UL Grant for scheduling the PUSCH is sent via the subframe 8 of the SCC, and $W_{DAI}^{UL}$=1. This case belongs to the second case in the fourth method.

The PCC uses the TDD uplink-downlink configuration 2, the $B_c^{DL}$ of the PCC is equal to min{$W_{DAI}^{UL}$, $M_c$}=min{1, 4}=1. It is supposed that the PCC uses the transmission mode of SIMO, then the number of bits of the HARQ-ACK feedback information of the PCC is $O_c^{ACK}=B_c^{DL}=1$.

The SCC uses the TDD uplink-downlink configuration 5, the $B_c^{DL}$ of the SCC is equal to $M_c$=9. It is supposed that the SCC uses the transmission mode of SIMO, then the number of bits of the HARQ-ACK feedback information of the SCC is $O_c^{ACK}=B_c^{DL}=9$.

Figure 4:
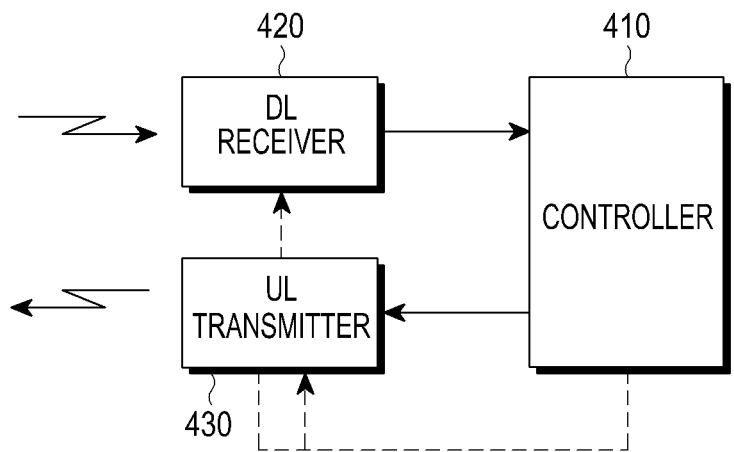
FIG. 4 is a block diagram of a User Equipment (UE) according to an embodiment of the present disclosure.

FIG. 4 is a block diagram of a UE according to an embodiment of the present disclosure.

Referring to FIG. 4, the UE is adapted to comprise a controller 410, a downlink receiver 420, and an uplink transmitter 430. The downlink receiver 420 receives a signal via at least one of a PDCCH and a PDSCH. The controller 410 is configured to determine the number of downlink subframes corresponding to HARQ-ACK feedback information sent in the PUSCH of each CC in a current uplink subframe, according to at least one of the received PDCCH, an UL DAI obtained from a UL Grant of the PDCCH, a sum of the number of PDSCH subframes received from a HARQ-ACK bundling window and the number of PDCCHs indicating downlink SPS releasing, and the size of the HARQ-ACK bundling window. The controller 410 is configured to determine the number of bits of the HARQ-ACK feedback information of each CC according to the number of the downlink subframes. The uplink transmitter 430 sends the HARQ-ACK feedback information of each CC via the PUSCH in the current uplink subframe.

Figure 5:
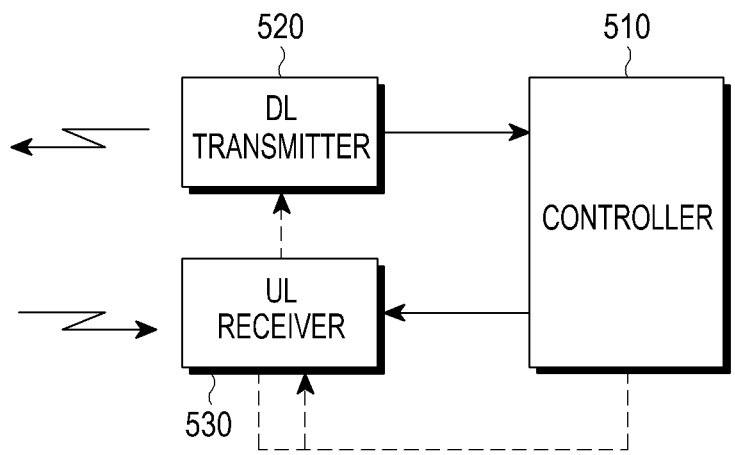
FIG. 5 is a block diagram of a Base Station (BS) according to an embodiment of the present disclosure.

FIG. 5 is a block diagram of BS according to an embodiment of the present disclosure.

Referring to FIG. 5, the BS is adapted to comprise a controller 510, a downlink transmitter 520, and an uplink receiver 530. The downlink transmitter 520 transmits a signal via at least one of a PDCCH and a PDSCH. The controller 510 is configured to determine the number of downlink subframes corresponding to HARQ-ACK feedback information sent in the PUSCH of each CC in a current uplink subframe, according to at least one of the PDCCH, an UL DAI obtained from an UL Grant of the PDCCH, a sum of the number of PDSCH subframes received from a HARQ-ACK bundling window and the number of PDCCHs indicating downlink SPS releasing, and the size of the HARQ-ACK bundling window. The controller 510 is configured to determine the number of bits of the HARQ-ACK feedback information of each CC according to the number of the downlink subframes. The uplink receiver 530 receives the HARQ-ACK feedback information of each CC via the PUSCH in the current uplink subframe.

As can be seen from the above embodiments, according to the method for sending HARQ-ACK feedback information provided by the embodiments of the present disclosure, the UE first determines the number of downlink subframes corresponding to the HARQ-ACK feedback information sent in the PUSCH of each CC in the current uplink subframe, according to at least one of the received PDCCH, the UL DAI obtained from the UL Grant of the PDCCH, the sum of the number of PDSCH subframes received from the HARQ-ACK bundling window and the number of PDCCHs indicating the downlink SPS releasing, and the size of the HARQ-ACK bundling window, and then determines the number of bits of the HARQ-ACK feedback information of each CC according to the number of the downlink subframes. Therefore, not only the HARQ-ACK feedback information can be transmitted correctly in the CA system in which the TDD uplink-downlink configurations of multiple CCs are different, but also the waste of PUSCH resources are avoided, and the case in which the TDD uplink-downlink configurations of multiple CCs in CA are different is supported.

The foregoing are only preferred embodiments of the present disclosure. It should be noted that those skilled in the art may make improvement and modification within the principle of the present disclosure, and the improvement and modification should be covered in the protection scope of the disclosure.

While the present disclosure has been shown and described with reference to various embodiments thereof, it will be understood by those skilled in the art that various changes in form and details may be made therein without departing from the scope of the present disclosure as defined by the appended claims and their equivalents.

The invention claimed is:

1. A method for transmitting hybrid automatic repeat request acknowledgement (HARQ-ACK) feedback information, the method comprising:
   receiving, by a user equipment (UE), at least one parameter related to HARQ-ACK feedback;
   determining, by the UE, one mode among a predetermined plurality of modes for determining a number of subframes for HARQ-ACK feedback based on the at least one parameter;
   determining, by the UE, a number of subframes for HARQ-ACK feedback using the at least one parameter based on the one mode;
   determining, by the UE, a number of HARQ-ACK feedback bits, based on the number of subframes;
   generating HARQ-ACK feedback information based on the number of HARQ-ACK feedback bits; and
   transmitting, by the UE, the HARQ-ACK feedback information, wherein the plurality of modes includes a first mode and a second mode, wherein, in the first mode, the number of subframes for HARQ-ACK feedback is determined by whether a transmission of a physical uplink shared channel (PUSCH) is not adjusted by a physical downlink control channel (PDCCH) with an uplink downlink assignment index (UL DAI) or the transmission of the PUSCH is adjusted by the PDCCH with the UL DAI, and, when the transmission of the PUSCH is adjusted by the PDCCH with the UL DAI, the number of subframes for HARQ-ACK feedback is determined by whether a component carrier (CC) in a current uplink subframe refers to a HARQ-ACK reference timing of a time division duplexing (TDD) uplink-downlink configuration 5 or configuration 0, 1, 2, 3, 4, or 6, and wherein, in the second mode, the number of subframes for HARQ-ACK feedback is determined by whether the transmission of the PUSCH is not adjusted by the PDCCH with the UL DAI or the transmission of the PUSCH is adjusted by the PDCCH with the UL DAI, and, when the transmission of the PUSCH is adjusted by the PDCCH with the UL DAI, the number of subframes for HARQ-ACK feedback is determined by whether all CCs configured for the UE comprise one or more CCs referring to the HARQ-ACK reference timing of the TDD uplink-downlink configuration 5 or none of the CCs configured for the UE refer to the HARQ-ACK reference timing of the TDD uplink-downlink configuration 5.

2. The method of claim 1, wherein, in the first mode, the determining of the number of subframes comprises:

when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC;

when the transmission of the PUSCH is adjusted by the PDCCH with the UL DAI, if a CC refers to the HARQ-ACK reference timing of the TDD uplink-downlink configuration 5, the number of subframes corresponding to the HARQ-ACK feedback information sent in the PUSCH of each CC in the current uplink subframe is calculated according to the equation:

$$B_c^{DL}=\min\{(W_{DAI}^{UL}+4*\text{ceiling}((U-W_{DAI}^{UL})/4)),M_c\},$$

where $B_c^{DL}$ is the number of subframes corresponding to the HARQ-ACK feedback information sent in the PUSCH of a CC c in the current uplink subframe, c is a sequence number of the CC, $W_{DAI}^{UL}$ is a value of the UL DAI obtained by the UE from an UL grant of the PDCCH, ceiling ( ) is a rounded up function, U is a maximum value of $U_c$ of multiple CCs in carrier aggregation (CA), which are the CCs configured for the UE and refer to the HARQ-ACK reference timing of the TDD uplink-downlink configuration 5, $U_c$ is a sum of a number of PDSCH subframes received from a subframe n-k of the CC c and a number of PDCCHs indicating a downlink semi-persistent scheduling (SPS) releasing, n is a sequence number of the current uplink subframe, k belongs to a set K which is a set of sequence numbers of downlink subframes in the HARQ-ACK bundling windows of the CC c corresponding to the uplink subframe n, and $M_c$ is a size of the HARQ-ACK bundling window of the CC c; and when the transmission of the PUSCH is adjusted by the PDCCH with the UL DAI, if the CC refers to the HARQ-ACK reference timing of the TDD uplink-downlink configuration 0, 1, 2, 3, 4, or 6, then $B_c^{DL}$ is equal to $\min\{W_{DAI}^{UL}, M_c\}$.

3. The method of claim 1, wherein, in the first mode, the determining of the number of subframes comprises:

when the transmission of the PUSCH is adjusted by the PDCCH with the UL DAI, the number of subframes corresponding to the HARQ-ACK feedback information sent in the PUSCH of each CC in the current uplink subframe is a size of a bundling window of the CC;

when the transmission of the PUSCH is adjusted by the PDCCH with the UL DAI, if a CC refers to the HARQ-ACK reference timing of the TDD uplink-downlink configuration 5, the number of subframes corresponding to the HARQ-ACK feedback information sent in the PUSCH of each CC in the current uplink subframe is calculated according to the equation:

$$B_c^{DL}=\min\{(W_{DAI}^{UL}+4*\text{ceiling}((U_c-W_{DAI}^{UL})/4)),M_c\},$$

where $B_c^{DL}$ is a number of subframes corresponding to the HARQ-ACK feedback information sent in the PUSCH of a CC c in the current uplink subframe, c is a sequence number of the CC, $W_{DAI}^{UL}$ is a value of the UL DAI obtained by the UE from an UL grant of the PDCCH, ceiling ( ) is a rounded up function, $U_c$ is a sum of a number of PDSCH subframes received from a subframe n-k of the CC c and a number of PDCCHs indicating a downlink semi-persistent scheduling (SPS) releasing, n is a sequence number of the current uplink subframe, k belongs to a set K which is a set of sequence numbers of downlink subframes in the HARQ-ACK bundling windows of the CC c corresponding to the uplink subframe n, and $M_c$ is a size of the HARQ-ACK bundling window of the CC c; and when the transmission of the PUSCH is adjusted by the PDCCH with the UL DAI, if the CC refers to the HARQ-ACK reference timing of the TDD uplink-downlink configuration 0, 1, 2, 3, 4, or 6, then $B_c^{DL}$ is equal to $\min\{W_{DAI}^{UL}, M_c\}$.

4. The method of claim 1, wherein, in the second mode, the determining of the number of subframes comprises:

when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC;

when the transmission of the PUSCH is adjusted by the PDCCH with the UL DAI, if all CCs configured for the UE comprise one or more CCs referring to the HARQ-ACK reference timing of the TDD uplink-downlink configuration 5, the number of subframes corresponding to the HARQ-ACK feedback information sent in the PUSCH of each of the CCs configured for the UE in the current uplink subframe is calculated according to the equation:

$$B_c^{DL}=\min\{(W_{DAI}^{UL}+4*\text{ceiling}((U-W_{DAI}^{UL})/4)),M_c\},$$

where $B_c^{DL}$ is a number of subframes corresponding to the HARQ-ACK feedback information sent in the PUSCH of a CC c in the current uplink subframe, c is a sequence number of the CC, $W_{DAI}^{UL}$ is a value of the UL DAI obtained by the UE from an UL grant of the PDCCH, ceiling ( ) is a rounded up function, U is a maximum value of the $U_c$ of all CCs configured for the UE, $U_c$ is a sum of a number of PDSCH subframes received from a subframe n-k of the CC c and a number of PDCCHs indicating a downlink SPS releasing, n is a sequence number of the current uplink subframe, k belongs to a set K which is a set of sequence numbers of downlink subframes in the HARQ-ACK bundling windows of the CC c corresponding to the uplink subframe n, and $M_c$ is a size of the HARQ-ACK bundling window of the CC c; and when the transmission of the PUSCH is adjusted by the PDCCH with the UL DAI, if none of the CCs configured for the UE refer to the HARQ-ACK reference timing of the TDD uplink-downlink configuration 5, $B_c^{DL}$ is equal to $\min\{W_{DAI}^{UL}, M_c\}$ for all the CCs configured for the UE.

5. The method of claim 1, wherein the plurality of modes includes a third mode, and in the third mode the determining of the number of subframes comprises:

when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC;

when the transmission of the PUSCH is adjusted by the PDCCH with the UL DAI, if all CCs configured for the UE comprise one or more CCs referring to the HARQ-ACK reference timing of the TDD uplink-downlink configuration 5, $B_c^{DL}$ is equal to $M_c$ for all the CCs; and when the transmission of the PUSCH is adjusted by the PDCCH with the UL DAI, if none of multiple CCs in carrier aggregation (CA) configured for the UE refer to the HARQ-ACK reference timing of the TDD uplink-downlink configuration 5, $B_c^{DL}$ is equal to $\min\{W_{DAI}^{UL}, M_c\}$ for all the CCs, where $M_c$ is a size of the HARQ-ACK bundling window of a CC c, $B_c^{DL}$ is a number of subframes corresponding to the HARQ-ACK feedback information sent in the PUSCH of the CC c in the current uplink subframe, and $W_{DAI}^{UL}$ is a value of the UL DAI obtained by the UE from an UL grant of the PDCCH.

6. The method of claim 1, wherein the plurality of modes includes a fourth mode, and in the fourth mode the determining of the number of subframes comprises:

when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC;

when the transmission of the PUSCH is adjusted by the PDCCH with the UL DAI, if all CCs configured for the UE comprise one or more CCs referring to the HARQ-ACK reference timing of the TDD uplink-downlink configuration 5, $B_c^{DL}$ is equal to $M_c$ for a CC referring to the HARQ-ACK reference timing of the TDD uplink-downlink configuration 5, or $B_c^{DL}$ is equal to $\min\{W_{DAI}^{UL}, M_c\}$ for a CC referring to the HARQ-ACK reference timing of the TDD uplink-downlink configuration 0, 1, 2, 3, 4, or 6; and when the transmission of the PUSCH is adjusted by the PDCCH with the UL DAI, if none of multiple CCs in carrier aggregation (CA) configured for the UE refer to the HARQ-ACK reference timing of the TDD uplink-downlink configuration 5, $B_c^{DL}$ is equal to $\min\{W_{DAI}^{UL}, M_c\}$ for all the CCs, where $M_c$ is a size of the HARQ-ACK bundling window of a CC c, $B_c^{DL}$ is a number of subframes corresponding to the HARQ-ACK feedback information sent in the PUSCH of the CC c in the current uplink subframe, and $W_{DAI}^{UL}$ is a value of the UL DAI obtained by the UE from an UL grant of the PDCCH.

7. The method of claim 1, wherein the determining the number of the HARQ-ACK feedback bits comprises:

when a transmission mode of a CC c is single input multiple output (SIMO), or when a transmission mode of the CC c is multiple input multiple output (MIMO) and spatial bundling is performed for the transmitting the HARQ-ACK feedback information of the CC c, $O_c^{ACK} = B_c^{DL}$; and when a transmission mode of the CC c is MIMO and spatial bundling is not performed for the transmitting the HARQ-ACK feedback information of the CC c, $O_c^{ACK} = 2 * B_c^{DL}$; and $O_c^{ACK}$ is the number of the HARQ-ACK feedback bits of the CC c.

8. The method of claim 1, wherein TDD uplink-downlink configurations of multiple CCs in carrier aggregation (CA) configured for the UE are different.

9. The method of claim 1, wherein the UL DAI is obtained from an UL grant of the PDCCH, a sum of a number of PDSCH subframes received from a HARQ-ACK bundling window and a number of PDCCHs indicating downlink semi-persistent scheduling (SPS) releasing, and a size of the HARQ-ACK bundling window.

10. The method of claim 1, wherein the HARQ-ACK feedback information of each CC is sent via a PUSCH of each CC in the current uplink subframe.

11. An apparatus of a user equipment (UE) for transmitting hybrid automatic repeat request acknowledgement (HARQ-ACK) feedback information, the apparatus comprising:

a controller comprising at least one processor configured to:
receive at least one parameter related to HARQ-ACK feedback,
determine one mode among a predetermined plurality of modes for determining a number of subframes for HARQ-ACK feedback based on the at least one parameter,
determine a number of subframes for HARQ-ACK feedback using the at least one parameter based on the one mode,
determine a number of HARQ-ACK feedback bits based on the number of subframes, and
generate HARQ-ACK feedback information based on the number of HARQ-ACK feedback bits; and a transmitter configured to transmit the HARQ-ACK feedback information, wherein the plurality of modes includes a first mode and a second mode, wherein, in the first mode, the number of subframes for HARQ-ACK feedback is determined by whether a transmission of a physical uplink shared channel (PUSCH) is not adjusted by a physical downlink control channel (PDCCH) with an uplink downlink assignment index (UL DAI) or the transmission of the PUSCH is adjusted by the PDCCH with the UL DAI, and, when the transmission of the PUSCH is adjusted by the PDCCH with the UL DAI, the number of subframes for HARQ-ACK feedback is determined by whether a component carrier (CC) in a current uplink subframe refers to a HARQ-ACK reference timing of a time division duplexing (TDD) uplink-downlink configuration 5 or configuration 0, 1, 2, 3, 4, or 6, and wherein, in the second mode, the number of subframes for HARQ-ACK feedback is determined by whether the transmission of the PUSCH is not adjusted by the PDCCH with the UL DAI or the transmission of the PUSCH is adjusted by the PDCCH with the UL DAI, and, when the transmission of the PUSCH is adjusted by the PDCCH with the UL DAI, the number of subframes for HARQ-ACK feedback is determined by whether all CCs configured for the UE comprise one or more CCs referring to the HARQ-ACK reference timing of the TDD uplink-downlink configuration 5 or none of the CCs configured for the UE refer to the HARQ-ACK reference timing of the TDD uplink-downlink configuration 5.

12. The apparatus of claim 11, wherein, in the first mode, when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC, wherein, when the transmission of the PUSCH is adjusted by the PDCCH with the UL DAI, if a CC refers to the HARQ-ACK reference timing of the TDD uplink-downlink configuration 5, the number of subframes corresponding to the HARQ-ACK feedback information sent in the PUSCH of each CC in the current uplink subframe is calculated according to the equation:

$$B_c^{DL} = \min\{(W_{DAI}^{UL} + 4 * \text{ceiling}((U - W_{DAI}^{UL})/4)), M_c\},$$

where $B_c^{DL}$ is the number of subframes corresponding to the HARQ-ACK feedback information sent in the PUSCH of a CC c in the current uplink subframe, c is a sequence number of the CC, $W_{DAI}^{UL}$ is a value of the UL DAI obtained by the UE from an UL grant of the PDCCH, ceiling ( ) is a rounded up function, U is a maximum value of $U_c$ of multiple CCs in carrier aggregation (CA), which are the CCs configured for the UE and refer to the HARQ-ACK reference timing of the TDD uplink-downlink configuration 5, $U_c$ is a sum of a number of PDSCH subframes received from a subframe n-k of the CC c and a number of PDCCHs indicating a downlink semi-persistent scheduling (SPS) releasing, n is a sequence number of the current uplink subframe, k belongs to a set K which is a set of sequence numbers of downlink subframes in the HARQ-ACK bundling windows of the CC c corresponding to the uplink subframe n, and $M_c$ is a size of the HARQ-ACK bundling window of the CC c, and wherein, when the transmission of the PUSCH is adjusted by the PDCCH with the UL DAI, if the CC refers to the HARQ-ACK reference timing of the TDD uplink-downlink configuration 0, 1, 2, 3, 4, or 6, then $B_c^{DL}$ is equal to min $\{W_{DAI}^{UL}, M_c\}$.

13. The apparatus of claim 11, wherein, in the first mode, when the transmission of the PUSCH is adjusted by the PDCCH with the UL DAI, the number of subframes corresponding to the HARQ-ACK feedback information sent in the PUSCH of each CC in the current uplink subframe is a size of a bundling window of the CC, wherein, when the transmission of the PUSCH is adjusted by the PDCCH with the UL DAI, if a CC refers to the HARQ-ACK reference timing of the TDD uplink-downlink configuration 5, the number of subframes corresponding to the HARQ-ACK feedback information sent in the PUSCH of each CC in the current uplink subframe is calculated according to the equation:

$$B_c^{DL} = \min\{(W_{DAI}^{UL} + 4 * \text{ceiling}((U_c - W_{DAI}^{UL})/4)), M_c\},$$

where $B_c^{DL}$ is a number of subframes corresponding to the HARQ-ACK feedback information sent in the PUSCH of a CC c in the current uplink subframe, c is a sequence number of the CC, $W_{DAI}^{UL}$ is a value of the UL DAI obtained by the UE from an UL grant of the PDCCH, ceiling ( ) is a rounded up function, $U_c$ is a sum of a number of PDSCH subframes received from a subframe n-k of the CC c and a number of PDCCHs indicating a downlink semi-persistent scheduling (SPS) releasing, n is a sequence number of the current uplink subframe, k belongs to a set K which is a set of sequence numbers of downlink subframes in the HARQ-ACK bundling windows of the CC c corresponding to the uplink subframe n, and $M_c$ is a size of the HARQ-ACK bundling window of the CC c, and wherein, when the transmission of the PUSCH is adjusted by the PDCCH with the UL DAI, if the CC refers to the HARQ-ACK reference timing of the TDD uplink-downlink configuration 0, 1, 2, 3, 4, or 6, then $B_c^{DL}$ is equal to $\min\{W_{DAI}^{UL}, M_c\}$.

14. The apparatus of claim 11, wherein, in the second mode, when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC, wherein, when the transmission of the PUSCH is adjusted by the PDCCH with the UL DAI, if all CCs configured for the UE comprise one or more CCs referring to the HARQ-ACK reference timing of the TDD uplink-downlink configuration 5, the number of subframes corresponding to the HARQ-ACK feedback information sent in the PUSCH of each of the CCs configured for the UE in the current uplink subframe is calculated according to the equation:

$$B_c^{DL} = \min\{(W_{DAI}^{UL} + 4 * \text{ceiling}((U - W_{DAI}^{UL})/4)), M_c\},$$

where $B_c^{DL}$ is a number of subframes corresponding to the HARQ-ACK feedback information sent in the PUSCH of a CC c in the current uplink subframe, c is a sequence number of the CC, $W_{DAI}^{UL}$ is a value of the UL DAI obtained by the UE from an UL grant of the PDCCH, ceiling ( ) is a rounded up function, U is a maximum value of the $U_c$ of all CCs configured for the UE, $U_c$ is a sum of a number of PDSCH subframes received from a subframe n-k of the CC c and a number of PDCCHs indicating a downlink SPS releasing, n is a sequence number of the current uplink subframe, k belongs to a set K which is a set of sequence numbers of downlink subframes in the HARQ-ACK bundling windows of the CC c corresponding to the uplink subframe n, and $M_c$ is a size of the HARQ-ACK bundling window of the CC c, and wherein, when the transmission of the PUSCH is adjusted by the PDCCH with the UL DAI, if none of the CCs configured for the UE refer to the HARQ-ACK reference timing of the TDD uplink-downlink configuration 5, $B_c^{DL}$ is equal to $\min\{W_{DAI}^{UL}, M_c\}$ for all the CCs configured for the UE.

15. The apparatus of claim 11, wherein the plurality of modes includes a third mode, and in the third mode, when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC, wherein, when the transmission of the PUSCH is adjusted by the PDCCH with the UL DAI, if all CCs configured for the UE comprise one or more CCs referring to the HARQ-ACK reference timing of the TDD uplink-downlink configuration 5, $B_c^{DL}$ is equal to $M_c$ for all the CCs, and wherein, when the transmission of the PUSCH is adjusted by the PDCCH with the UL DAI, if none of multiple CCs in carrier aggregation (CA) configured for the UE refer to the HARQ-ACK reference timing of the TDD uplink-downlink configuration 5, $B_c^{DL}$ is equal to $\min\{W_{DAI}^{UL}, M_c\}$ for all the CCs, where $M_c$ is a size of the HARQ-ACK bundling window of a CC c, $B_c^{DL}$ is a number of subframes corresponding to the HARQ-ACK feedback information sent in the PUSCH of the CC c in the current uplink subframe, and $W_{DAI}^{UL}$ is a value of the UL DAI obtained by the UE from an UL grant of the PDCCH.

16. The apparatus of claim 11, wherein the plurality of modes includes a fourth mode, and in the fourth mode, when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC, wherein, when the transmission of the PUSCH is adjusted by the PDCCH with the UL DAI, if all CCs configured for the UE comprise one or more CCs referring to the HARQ-ACK reference timing of the TDD uplink-downlink configuration 5, $B_c^{DL}$ is equal to $M_c$ for a CC referring to the HARQ-ACK reference timing of the TDD uplink-downlink configuration 5, or $B_c^{DL}$ is equal to $\min\{W_{DAI}^{UL}, M_c\}$ for a CC referring to the HARQ-ACK reference timing of the TDD uplink-downlink configuration 0, 1, 2, 3, 4, or 6, and wherein, when the transmission of the PUSCH is adjusted by the PDCCH with the UL DAI, if none of multiple CCs in carrier aggregation (CA) configured for the UE refer to the HARQ-ACK reference timing of the TDD uplink-downlink configuration 5, $B_c^{DL}$ is equal to $\min\{W_{DAI}^{UL}, M_c\}$ for all the CCs, where $M_c$ is a size of the HARQ-ACK bundling window of a CC c, $B_c^{DL}$ is a number of subframes corresponding to the HARQ-ACK feedback information sent in the PUSCH of the CC c in the current uplink subframe, and $W_{DAI}^{UL}$ is a value of the UL DAI obtained by the UE from an UL grant of the PDCCH.

17. The apparatus of claim 11, wherein, when a transmission mode of a CC c is single input multiple output (SIMO), or when a transmission mode of the CC c is multiple input multiple output (MIMO) and spatial bundling is performed for the transmitting the HARQ-ACK feedback information of the CC c, $O_c^{ACK}=B_c^{DL}$, wherein, when a transmission mode of the CC c is MIMO and spatial bundling is not performed for the transmitting the HARQ-ACK feedback information of the CC c, $O_c^{ACK}=2*B_c^{DL}$, and wherein $O_c^{ACK}$ is the number of the HARQ-ACK feedback bits of the CC c.

18. The apparatus of claim 11, wherein TDD uplink-downlink configurations of multiple CCs in carrier aggregation (CA) configured for the UE are different.

19. The apparatus of claim 11, wherein the UL DAI is obtained from an UL grant of the PDCCH, a sum of a number of PDSCH subframes received from a HARQ-ACK bundling window and a number of PDCCHs indicating downlink semi-persistent scheduling (SPS) releasing, and a size of the HARQ-ACK bundling window.

20. The apparatus of claim 11, wherein the HARQ-ACK feedback information of each CC is sent via a PUSCH of each CC in the current uplink subframe.

21. A method for receiving hybrid automatic repeat request acknowledgement (HARQ-ACK) feedback information, the method comprising:

determining, by a base station (BS), one mode among a predetermined plurality of modes for determining a number of subframes for HARQ-ACK feedback;

transmitting, by the BS, at least one parameter related to the one mode;

determining, by the BS, a number of subframes for HARQ-ACK feedback using the at least one parameter based on the one mode;

determining, by the BS, a number of HARQ-ACK feedback bits based on the number of subframes; and receiving, by the BS, HARQ-ACK feedback information having the number of HARQ-ACK feedback bits from a user equipment (UE), wherein the plurality of modes include a first mode and a second mode, wherein, in the first mode, the number of subframes for HARQ-ACK feedback is determined by whether a transmission of a physical uplink shared channel (PUSCH) is not adjusted by a physical downlink control channel (PDCCH) with an uplink downlink assignment index (UL DAI) or the transmission of the PUSCH is adjusted by the PDCCH with the UL DAI, and, when the transmission of the PUSCH is adjusted by the PDCCH with the UL DAI, the number of subframes for HARQ-ACK feedback is determined by whether a component carrier (CC) in a current uplink subframe refers to a HARQ-ACK reference timing of a time division duplexing (TDD) uplink-downlink configuration 5 or configuration 0, 1, 2, 3, 4, or 6, and wherein, in the second mode, the number of subframes for HARQ-ACK feedback is determined by whether the transmission of the PUSCH is not adjusted by the PDCCH with the UL DAI or the transmission of the PUSCH is adjusted by the PDCCH with the UL DAI, and, when the transmission of the PUSCH is adjusted by the PDCCH with the UL DAI, the number of subframes for HARQ-ACK feedback is determined by whether all CCs configured for the UE comprise one or more CCs referring to the HARQ-ACK reference timing of the TDD uplink-downlink configuration 5 or none of the CCs configured for the UE refer to the HARQ-ACK reference timing of the TDD uplink-downlink configuration 5.

22. The method of claim 21,
wherein, in the first mode, when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC,
wherein, when the transmission of the PUSCH is adjusted by the PDCCH with the UL DAI, if a CC refers to the HARQ-ACK reference timing of the TDD uplink-downlink configuration 5, the number of subframes corresponding to the HARQ-ACK feedback information sent in the PUSCH of each CC in the current uplink subframe is calculated according to the equation:

$$B_c^{DL} = \min\{(W_{DAI}^{UL} + 4 * \text{ceiling}((U - W_{DAI}^{UL})/4)), M_c\},$$

where $B_c^{DL}$ is the number of subframes corresponding to the HARQ-ACK feedback information sent in the PUSCH of a CC c in the current uplink subframe,
c is a sequence number of the CC,
$W_{DAI}^{UL}$ is a value of the UL DAI obtained by the UE from an UL grant of the PDCCH,
ceiling ( ) is a rounded up function,
U is a maximum value of $U_c$ of multiple CCs in carrier aggregation (CA), which are the CCs configured for the UE and refer to the HARQ-ACK reference timing of the TDD uplink-downlink configuration 5,
$U_c$ is a sum of a number of PDSCH subframes received from a subframe n-k of the CC c and a number of PDCCHs indicating a downlink semi-persistent scheduling (SPS) releasing,
n is a sequence number of the current uplink subframe,
k belongs to a set K which is a set of sequence numbers of downlink subframes in the HARQ-ACK bundling windows of the CC c corresponding to the uplink subframe n, and
$M_c$ is a size of the HARQ-ACK bundling window of the CC c, and
wherein, when transmission of the PUSCH is adjusted by the PDCCH with the UL DAI, if the CC refers to the HARQ-ACK reference timing of the TDD uplink-downlink configuration 0, 1, 2, 3, 4, or 6, then $B_c^{DL}$ is equal to $\min\{W_{DAI}^{UL}, M_c\}$.

23. The method of claim 21,
wherein, in the first mode, when the transmission of the PUSCH is adjusted by the PDCCH with the UL DAI, the number of subframes corresponding to the HARQ-ACK feedback information sent in the PUSCH of each CC in the current uplink subframe is a size of a bundling window of the CC,
wherein, when the transmission of the PUSCH is adjusted by the PDCCH with the UL DAI, if a CC refers to the HARQ-ACK reference timing of the TDD uplink-downlink configuration 5, the number of subframes corresponding to the HARQ-ACK feedback information sent in the PUSCH of each CC in the current uplink subframe is calculated according to the equation:

$$B_c^{DL} = \min\{(W_{DAI}^{UL} + 4 * \text{ceiling}((U_c - W_{DAI}^{UL})/4)), M_c\},$$

where $B_c^{DL}$ is a number of subframes corresponding to the HARQ-ACK feedback information sent in the PUSCH of a CC c in the current uplink subframe,
c is a sequence number of the CC,
$W_{DAI}^{UL}$ is a value of the UL DAI obtained by the UE from an UL grant of the PDCCH,
ceiling ( ) is a rounded up function,
$U_c$ is a sum of a number of PDSCH subframes received from a subframe n-k of the CC c and a number of PDCCHs indicating a downlink semi-persistent scheduling (SPS) releasing,
n is a sequence number of the current uplink subframe,
k belongs to a set K which is a set of sequence numbers of downlink subframes in the HARQ-ACK bundling windows of the CC c corresponding to the uplink subframe n, and
$M_c$ is a size of the HARQ-ACK bundling window of the CC c, and
wherein when the transmission of the PUSCH is adjusted by the PDCCH with the UL DAI, if the CC refers to the HARQ-ACK reference timing of the TDD uplink-downlink configuration 0, 1, 2, 3, 4, or or 6, then $B_c^{DL}$ is equal to $\min\{W_{DAI}^{UL}, M_c\}$.

24. The method of claim 21,
wherein, in the second mode, when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC,
wherein, when the transmission of the PUSCH is adjusted by the PDCCH with the UL DAI, if all CCs configured for the UE comprise one or more CCs referring to the HARQ-ACK reference timing of the TDD uplink-downlink configuration 5, the number of subframes corresponding to the HARQ-ACK feedback information sent in the PUSCH of each of the CCs configured for the UE in the current uplink subframe is calculated according to the equation:

$$B_c^{DL} = \min\{(W_{DAI}^{UL} + 4 * \text{ceiling}((U - W_{DAI}^{UL})/4)), M_c\},$$

where $B_c^{DL}$ is a number of subframes corresponding to the HARQ-ACK feedback information sent in the PUSCH of a CC c in the current uplink subframe,
c is a sequence number of the CC,
$W_{DAI}^{UL}$ is a value of the UL DAI obtained by the UE from an UL grant of the PDCCH,
ceiling ( ) is a rounded up function,
U is a maximum value of the $U_c$ of all CCs configured for the UE,
$U_c$ is a sum of a number of PDSCH subframes received from a subframe n-k of the CC c and a number of PDCCHs indicating a downlink semi-persistent scheduling (SPS) releasing,
n is a sequence number of the current uplink subframe,
k belongs to a set K which is a set of sequence numbers of downlink subframes in the HARQ-ACK bundling windows of the CC c corresponding to the uplink subframe n, and
$M_c$ is a size of the HARQ-ACK bundling window of the CC c, and
wherein, when the transmission of the PUSCH is adjusted by the PDCCH with the UL DAI, if none of the CCs configured for the UE refer to the HARQ-ACK reference timing of the TDD uplink-downlink configuration 5, $B_c^{DL}$ is equal to $\min\{W_{DAI}^{UL}, M_c\}$ for all the CCs configured for the UE.

25. The method of claim 21,
wherein the plurality of modes includes a third mode, and in the third mode, when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC,
wherein, when the transmission of the PUSCH is adjusted by the PDCCH with the UL DAI, if all CCs configured for the UE comprise one or more CCs referring to the HARQ-ACK reference timing of the TDD uplink-downlink configuration 5, $B_c^{DL}$ is equal to $M_c$ for all the CCs,
wherein, when the transmission of the PUSCH is adjusted by the PDCCH with the UL DAI, if none of multiple CCs in carrier aggregation (CA) configured for the UE refer to the HARQ-ACK reference timing of the TDD uplink-downlink configuration 5, $B_c^{DL}$ is equal to $\min\{W_{DAI}^{UL}, M_c\}$ for all the CCs, and
wherein $M_c$ is a size of the HARQ-ACK bundling window of a CC c, $B_c^{DL}$ is a number of subframes corresponding to the HARQ-ACK feedback information sent in the PUSCH of the CC c in the current uplink subframe, and $W_{DAI}^{UL}$ is a value of the UL DAI obtained by the UE from an UL grant of the PDCCH.

26. The method of claim 21,
wherein the plurality of modes includes a fourth mode, and in the fourth mode, when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC,
wherein, when the transmission of the PUSCH is adjusted by the PDCCH with the UL DAI, if all CCs configured for the UE comprise one or more CCs referring to the HARQ-ACK reference timing of the TDD uplink-downlink configuration 5, $B_c^{DL}$ is equal to $M_c$ for a CC referring to the HARQ-ACK reference timing of the TDD uplink-downlink configuration 5, or $B_c^{DL}$ is equal to $\min\{W_{DAI}^{UL}, M_c\}$ for a CC referring to the HARQ-ACK reference timing of the TDD uplink-downlink configuration 0, 1, 2, 3, 4, or 6,
wherein, when the transmission of the PUSCH is adjusted by the PDCCH with the UL DAI, if none of multiple CCs in carrier aggregation (CA) configured for the UE refers to the HARQ-ACK reference timing of the TDD uplink-downlink configuration 5, $B_c^{DL}$ is equal to $\min\{W_{DAI}^{UL}, M_c\}$ for all the CCs, and
wherein $M_c$ is a size of the HARQ-ACK bundling window of a CC c, $B_c^{DL}$ is a number of subframes corresponding to the HARQ-ACK feedback information sent in the PUSCH of the CC c in the current uplink subframe, and $W_{DAI}^{UL}$ is a value of the UL DAI obtained by the UE from an UL grant of the PDCCH.

27. The method of claim 21,
wherein, when a transmission mode of a CC c is single input multiple output (SIMO), or when a transmission mode of the CC c is multiple input multiple output (MIMO) and spatial bundling is performed for the transmitting the HARQ-ACK feedback information of the CC c, $O_c^{ACK}=B_c^{DL}$, and
wherein, when a transmission mode of the CC c is MIMO and spatial bundling is not performed for the transmitting the HARQ-ACK feedback information of the CC c, $O_c^{ACK}=2*B_c^{DL}$, and $O_c^{ACK}$ is the number of the HARQ-ACK feedback bits of the CC c.

28. The method of claim 21, wherein TDD uplink-downlink configurations of multiple CCs in carrier aggregation (CA) configured for the UE are different.

29. The method of claim 21, wherein the UL DAI is obtained from an UL grant of the PDCCH, a sum of a number of PDSCH subframes received from a HARQ-ACK bundling window and a number of PDCCHs indicating downlink semi-persistent scheduling (SPS) releasing, and a size of the HARQ-ACK bundling window.

30. The method of claim 21, wherein the HARQ-ACK feedback information of each CC is sent via a PUSCH of each CC in the current uplink subframe.

31. An apparatus of a base station (BS) for receiving hybrid automatic repeat request acknowledgement (HARQ-ACK) feedback information, the apparatus comprising:
a controller comprising at least one processor configured to:
determine one mode among a predetermined plurality of modes for determining a number of subframes for HARQ-ACK feedback,
transmit at least one parameter related to the one mode,
determine a number of subframes for HARQ-ACK feedback using the at least one parameter based on the one mode, and
determine a number of HARQ-ACK feedback bits based on the number of subframes; and
an uplink receiver configured to receive HARQ-ACK feedback information having the number of HARQ-ACK feedback bits from a user equipment (UE),
wherein the plurality of modes includes a first mode and a second mode,
wherein, in the first mode, the number of subframes for HARQ-ACK feedback is determined by whether a transmission of a physical uplink shared channel (PUSCH) is not adjusted by a physical downlink control channel (PDCCH) with an uplink downlink assignment index (UL DAI) or the transmission of the PUSCH is adjusted by the PDCCH with the UL DAI, and, when the transmission of the PUSCH is adjusted by the PDCCH with the UL DAI, the number of subframes for HARQ-ACK feedback is determined by whether a component carrier (CC) in a current uplink subframe refers to a HARQ-ACK reference timing of a time division duplexing (TDD) uplink-downlink configuration 5 or configuration 0, 1, 2, 3, 4, or 6, and
wherein, in the second mode, the number of subframes for HARQ-ACK feedback is determined by whether the transmission of the PUSCH is not adjusted by the PDCCH with the UL DAI or the transmission of the PUSCH is adjusted by the PDCCH with the UL DAI, and, when the transmission of the PUSCH is adjusted by the PDCCH with the UL DAI, the number of subframes for HARQ-ACK feedback is determined by whether all CCs configured for the UE comprise one or more CCs referring to the HARQ-ACK reference timing of the TDD uplink-downlink configuration 5 or none of the CCs configured for the UE refer to the HARQ-ACK reference timing of the TDD uplink-downlink configuration 5.

32. The apparatus of claim 31,
wherein, in the first mode, when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC, wherein, when the transmission of the PUSCH is adjusted by the PDCCH with the UL DAI, if the CC refers to the HARQ-ACK reference timing of the TDD uplink-downlink configuration 5, the number of subframes corresponding to the HARQ-ACK feedback information sent in the PUSCH of each CC in the current uplink subframe is calculated according to the equation:

$$B_c^{DL}=\min\{(W_{DAI}^{UL}+4*\text{ceiling}((U-W_{DAI}^{UL})/4)),M_c\},$$

where $B_c^{DL}$ is the number of subframes corresponding to the HARQ-ACK feedback information sent in the PUSCH of a CC c in the current uplink subframe, c is a sequence number of the CC, $W_{DAI}^{UL}$ is a value of the UL DAI obtained by the UE from an UL grant of the PDCCH, ceiling ( ) is a rounded up function, U is a maximum value of $U_c$ of multiple CCs in carrier aggregation (CA), which are the CCs configured for the UE and refer to the HARQ-ACK reference timing of the TDD uplink-downlink configuration 5, $U_c$ is a sum of a number of PDSCH subframes received from a subframe n-k of the CC c and a number of PDCCHs indicating a downlink semi-persistent scheduling (SPS) releasing, n is a sequence number of the current uplink subframe, k belongs to a set K which is a set of sequence numbers of downlink subframes in the HARQ-ACK bundling windows of the CC c corresponding to the uplink subframe n, and $M_c$ is a size of the HARQ-ACK bundling window of the CC c, and wherein, when the transmission of the PUSCH is adjusted by the PDCCH with the UL DAI, if the CC refers to the HARQ-ACK reference timing of the TDD uplink-downlink configuration 0, 1, 2, 3, 4, or 6, then BDL is equal to min $\{W_{DAI}^{UL}, M_c\}$.

33. The apparatus of claim 31, wherein, in the first mode, when the transmission of the PUSCH is adjusted by the PDCCH with the UL DAI, the number of subframes corresponding to the HARQ-ACK feedback information sent in the PUSCH of each CC in the current uplink subframe is a size of a bundling window of the CC, wherein, when the transmission of the PUSCH is adjusted by the PDCCH with the UL DAI, if the CC refers to the HARQ-ACK reference timing of the TDD uplink-downlink configuration 5, the number of subframes corresponding to the HARQ-ACK feedback information sent in the PUSCH of each CC in the current uplink subframe is calculated according to the equation:

$$B_c^{DL}=\min\{(W_{DAI}^{UL}+4*\text{ceiling}((U_c-W_{DAI}^{UL})/4)),M_c\},$$

where $B_c^{DL}$ is a number of subframes corresponding to the HARQ-ACK feedback information sent in the PUSCH of a CC c in the current uplink subframe, c is a sequence number of the CC, $W_{DAI}^{UL}$ is a value of the UL DAI obtained by the UE from an UL grant of the PDCCH, ceiling ( ) is a rounded up function, $U_c$ is a sum of a number of PDSCH subframes received from a subframe n-k of the CC c and a number of PDCCHs indicating a downlink semi-persistent scheduling (SPS) releasing, n is a sequence number of the current uplink subframe, k belongs to a set K which is a set of sequence numbers of downlink subframes in the HARQ-ACK bundling windows of the CC c corresponding to the uplink subframe n, and $M_c$ is a size of the HARQ-ACK bundling window of the CC c, and wherein, when the transmission of the PUSCH is adjusted by the PDCCH with the UL DAI, if the CC refers to the HARQ-ACK reference timing of the TDD uplink-downlink configuration 0, 1, 2, 3, 4, or 6, then $B_c^{DL}$ is equal to min$\{W_{DAI}^{UL}, M_c\}$.

34. The apparatus of claim 31, wherein, in the second mode, when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC, wherein, when the transmission of the PUSCH is adjusted by the PDCCH with the UL DAI, if all CCs configured for the UE comprise one or more CCs referring to the HARQ-ACK reference timing of the TDD uplink-downlink configuration 5, the number of subframes corresponding to the HARQ-ACK feedback information sent in the PUSCH of each of the CCs configured for the UE in the current uplink subframe is calculated according to the equation:

$$B_c^{DL}=\min\{(W_{DAI}^{UL}+4*\text{ceiling}((U-W_{DAI}^{UL})/4)),M_c\},$$

where $B_c^{DL}$ is a number of subframes corresponding to the HARQ-ACK feedback information sent in the PUSCH of a CC c in the current uplink subframe, c is a sequence number of the CC, $W_{DAI}^{UL}$ is a value of the UL DAI obtained by the UE from an UL grant of the PDCCH, ceiling ( ) is a rounded up function, U is a maximum value of the $U_c$ of all CCs configured for the UE, $U_c$ is a sum of a number of PDSCH subframes received from a subframe n-k of the CC c and a number of PDCCHs indicating a downlink semi-persistent scheduling (SPS) releasing, n is a sequence number of the current uplink subframe, k belongs to a set K which is a set of sequence numbers of downlink subframes in the HARQ-ACK bundling windows of the CC c corresponding to the uplink subframe n, and $M_c$ is a size of the HARQ-ACK bundling window of the CC c, and wherein, when the transmission of the PUSCH is adjusted by the PDCCH with the UL DAI, if none of the CCs configured for the UE refer to the HARQ-ACK reference timing of the TDD uplink-downlink configuration 5, $B_c^{DL}$ is equal to min$\{W_{DAI}^{UL}, M_c\}$ for all the CCs configured for the UE.

35. The apparatus of claim 31, wherein the plurality of modes includes a third mode, and in the third mode, when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC, wherein, when the transmission of the PUSCH is adjusted by the PDCCH with the UL DAI, if all CCs configured for the UE comprise one or more CCs referring to the HARQ-ACK reference timing of the TDD uplink-downlink configuration 5, $B_c^{DL}$ is equal to $M_c$ for all the CCs, wherein, when the transmission of the PUSCH is adjusted by the PDCCH with the UL DAI, if none of multiple CCs in carrier aggregation (CA) configured for the UE refer to the HARQ-ACK reference timing of the TDD uplink-downlink configuration 5, $B_c^{DL}$ is equal to $\min\{W_{DAI}^{UL}, M_c\}$ for all the CCs, and wherein $M_c$ is a size of the HARQ-ACK bundling window of a CC c, $B_c^{DL}$ is a number of subframes corresponding to the HARQ-ACK feedback information sent in the PUSCH of the CC c in the current uplink subframe, and $W_{DAI}^{UL}$ is a value of the UL DAI obtained by the UE from an UL grant of the PDCCH.

36. The apparatus of claim 31, wherein the plurality of modes includes a fourth mode, and in the fourth mode, when the transmission of the PUSCH is not adjusted by the PDCCH with the UL DAI, the number of subframes corresponding to the HARQ-ACK feedback information sent in the PUSCH of each CC in the current uplink subframe is a size of a bundling window of the CC, wherein, when the transmission of the PUSCH is adjusted by the PDCCH with the UL DAI, if all CCs configured for the UE comprise one or more CCs referring to the HARQ-ACK reference timing of the TDD uplink-downlink configuration 5, $B_c^{DL}$ is equal to $M_c$ for a CC referring to the HARQ-ACK reference timing of the TDD uplink-downlink configuration 5, or $B_c^{DL}$ is equal to $\min\{W_{DAI}^{UL}, M_c\}$ for a CC referring to the HARQ-ACK reference timing of the TDD uplink-downlink configuration 0, 1, 2, 3, 4, or 6, wherein, when the transmission of the PUSCH is adjusted by the PDCCH with the UL DAI, if none of multiple CCs in carrier aggregation (CA) configured for the UE refer to the HARQ-ACK reference timing of the TDD uplink-downlink configuration 5, $B_c^{DL}$ is equal to $\min\{W_{DAI}^{UL}, M_c\}$ for all the CCs, and wherein $M_c$ is a size of the HARQ-ACK bundling window of a CC c, $B_c^{DL}$ is a number of subframes corresponding to the HARQ-ACK feedback information sent in the PUSCH of the CC c in the current uplink subframe, and $W_{DAI}^{UL}$ is a value of the UL DAI obtained by the UE from an UL grant of the PDCCH.

37. The apparatus of claim 31, wherein, when a transmission mode of a CC c is single input multiple output (SIMO), or when a transmission mode of the CC c is multiple input multiple output (MIMO) and spatial bundling is performed for the transmitting the HARQ-ACK feedback information of the CC c, $O_c^{ACK} = B_c^{DL}$, and wherein, when a transmission mode of the CC c is MIMO and spatial bundling is not performed for the transmitting the HARQ-ACK feedback information of the CC c, $O_c^{ACK} = 2*B_c^{DL}$, and $O_c^{ACK}$ is the number of the HARQ-ACK feedback bits of the CC c.

38. The apparatus of claim 31, wherein TDD uplink-downlink configurations of multiple CCs in carrier aggregation (CA) configured for the UE are different.

39. The apparatus of claim 31, wherein the UL DAI is obtained from an UL grant of the PDCCH, a sum of a number of PDSCH subframes received from a HARQ-ACK bundling window and a number of PDCCHs indicating downlink semi-persistent scheduling (SPS) releasing, and a size of the HARQ-ACK bundling window.

40. The apparatus of claim 31, wherein the HARQ-ACK feedback information of each CC is sent via a PUSCH of each CC in the current uplink subframe.

\* \* \* \* \*